(12) United States Patent
Wirola et al.

(10) Patent No.: US 11,480,647 B2
(45) Date of Patent: Oct. 25, 2022

(54) COLLECTING A DATABASE OF SPOOFED DEVICES

(71) Applicant: HERE GLOBAL B.V., Eindhoven (NL)

(72) Inventors: Lauri Aarne Johannes Wirola, Tampere (FI); Jari Syrjarinne, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/721,176

(22) Filed: Dec. 19, 2019

(65) Prior Publication Data
US 2020/0200858 A1    Jun. 25, 2020

(30) Foreign Application Priority Data

Dec. 20, 2018  (EP) ..................... 18214685

(51) Int. Cl.
*G01S 5/02*     (2010.01)
*G06F 16/29*    (2019.01)
*H04W 4/021*    (2018.01)

(52) U.S. Cl.
CPC ............ *G01S 5/0252* (2013.01); *G01S 5/021* (2013.01); *G01S 5/0284* (2013.01); *G06F 16/29* (2019.01); *H04W 4/021* (2013.01)

(58) Field of Classification Search
CPC ..... H04W 4/02; H04W 4/029; H04W 64/003; H04W 4/025; H04W 24/00; H04W 12/63; H04W 12/79; H04W 4/021; H04W 64/00; H04W 12/12; H04W 12/08; H04W 12/122; H04W 24/08; H04W 12/02; H04W 12/06; H04W 12/10; H04W 12/64; H04W 4/023; H04W 4/21; H04W 4/50; H04W 4/70; H04W 4/90; H04W 8/30; H04W 84/12; H04W 84/18; G01S 5/0236; G01S 5/0252; G01S 5/0242; G01S 5/0284; G01S 5/0226; G01S 5/0263; G01S 19/06; G01S 19/46; G01S 19/48; G01S 5/02; G01S 5/0205; G01S 5/021; G01S 5/0244; G01C 21/32;
(Continued)

(56) References Cited

U.S. PATENT DOCUMENTS 7,574,202 B1   8/2009  Tsao et al.
8,069,216 B2   11/2011 He et al.
(Continued)

FOREIGN PATENT DOCUMENTS

WO  WO 2015/189161 A1  12/2015
WO  WO-2016087008 A1 * 6/2016 ............. H04W 4/02

OTHER PUBLICATIONS

Partial European Search Report for Application No. EP 18 21 4685 dated Aug. 14, 2019, 13 pages.
(Continued)

*Primary Examiner* — Matthew C Sams
(74) *Attorney, Agent, or Firm* — Alston & Bird LLP

(57) ABSTRACT

A method, apparatus and computer-readable storage medium are provided that maintain a database including information identifying of one or more mobile devices. Each mobile device of the one or more mobile devices is configured to enable positioning based on radio signals. The positioning enabled by the respective mobile device is considered to be at least partially unexpected.

18 Claims, 7 Drawing Sheets

(58) Field of Classification Search
CPC ............ G01C 21/3492; G01C 21/3679; G01C 21/3682; G01C 21/3691; G01C 21/3697; G01C 21/3811; G01C 21/3889; G01C 21/26; G01C 21/3837; G06F 16/00; G06F 16/29; G06F 16/285; G06F 16/951; G06F 16/9537; G06F 2209/541; G06F 9/54; G06F 9/542; G08G 1/096716; H04L 41/145; H04L 2463/102; H04L 63/0853; H04L 63/102; H04L 63/107; H04L 63/1416; H04L 63/1425; H04L 63/302; G06Q 20/32; G06Q 20/382; G06Q 20/401; G06Q 20/4016; G06Q 20/405; G06Q 30/0207; G06Q 30/0239; G06Q 30/0259; G06Q 30/0267; G06Q 50/01; G06T 7/20; G06T 7/60; G06V 10/42; G06V 20/41; G06V 20/46; G06V 20/52; G06V 2201/10; G07G 3/003; G08B 13/00; H04B 1/18; H04B 17/10; H04B 17/391; H04K 2203/16; H04K 2203/18; H04K 3/22; H04M 15/8027; H04M 15/8033; H04M 15/8083; H04N 5/265

See application file for complete search history.

(56) References Cited

U.S. PATENT DOCUMENTS

| | | | | |
|---|---|---|---|---|
| 8,086,233 | B2 | 12/2011 | Millet et al. | |
| 8,805,403 | B2* | 8/2014 | Curticapean | G01S 5/0242 |
| | | | | 455/456.1 |
| 9,161,237 | B2* | 10/2015 | Kristoffersen | H04W 24/00 |
| 9,258,679 | B1* | 2/2016 | Williams | H04W 4/029 |
| 9,258,713 | B2 | 2/2016 | Rangarajan et al. | |
| 9,503,864 | B1 | 11/2016 | Chao et al. | |
| 9,705,913 | B2 | 7/2017 | Mirashrafi et al. | |
| 9,866,643 | B2 | 1/2018 | Douglas et al. | |
| 10,521,796 | B1* | 12/2019 | Newman | G06F 9/54 |
| 10,935,627 | B2* | 3/2021 | Wirola | H04W 12/122 |
| 10,942,245 | B2* | 3/2021 | Wirola | H04W 4/80 |
| 11,221,389 | B2* | 1/2022 | Wirola | H04W 12/128 |
| 11,350,281 | B2* | 5/2022 | Wirola | H04W 24/08 |
| 2003/0125046 | A1* | 7/2003 | Riley | G01S 5/0242 |
| | | | | 455/456.1 |
| 2010/0120422 | A1* | 5/2010 | Cheung | G01S 5/0236 |
| | | | | 455/434 |
| 2013/0196682 | A1* | 8/2013 | Kristoffersen | G01S 5/0236 |
| | | | | 455/456.1 |
| 2015/0351017 | A1 | 12/2015 | Wirola et al. | |
| 2016/0124071 | A1* | 5/2016 | Baxley | G06K 9/00771 |
| | | | | 348/143 |
| 2016/0323843 | A1 | 11/2016 | Morgan et al. | |
| 2017/0371024 | A1* | 12/2017 | Ivanov | H04W 64/00 |

OTHER PUBLICATIONS

GPS Spoofing a Growing Problem for Uber [online] [retrieved Feb. 17, 2020]. Retrieved via the Internet: https:/soliddriver.com/GPS-Spoofing-A-Growing-Problem-for-Uber (dated Nov. 10, 2019) 4 pages.

Galileo Commercial service Implementing Decision enters into force Uber [online] [retrieved Feb. 17, 2020]. Retrieved via the Internet: https://www.gsa.europa.eu/newsroom/news/galileo-commercial-service-implementing-decision-enters-force (dated Feb. 10, 2017) 6 pages.

Extended European Search Report for European Application No. 18214685.2 dated Nov. 29, 2019, 11 pages.

Office Action for European Application No. 18214685.2 dated Dec. 9, 2021, 6 pages.

* cited by examiner

COLLECTING A DATABASE OF SPOOFED DEVICES

CROSS-REFERENCE TO RELATED APPLICATIONS

This application claims priority to European Patent Application No. 18214685.2, filed Dec. 20, 2018, the entire contents of which are incorporated herein by reference.

FIELD OF THE DISCLOSURE

The invention relates to the field of non-GNSS based radio positioning and more specifically to a database for identifying mobile devices for which positioning is considered to be potentially manipulated.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS) or the Galileo system, do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated non-GNSS based radio positioning systems for indoor and outdoor positioning have been developed and commercially deployed during the past years. Examples comprise systems that are based on pseudolites, which are ground based GPS-like short-range beacons, ultra-sound positioning systems, Bluetooth low energy (BLE) based positioning systems, cellular network based positioning systems and wireless local area network (WLAN) based positioning systems. WLAN based positioning systems typically use the WLAN infrastructure "as is" i.e. do not typically require installation of additional access points or reconfiguration of the existing network unless the geometry of the access points is exceptionally unfavorable for the positioning purposes.

Such a non-GNSS based radio positioning system (e.g. a self-contained positioning system) may be divided in at least three stages, an installation stage, a training stage and a positioning stage.

In the installation stage, dedicated positioning support radio devices (e.g. Bluetooth beacons) may be installed in the environment for which a positioning system is to be provided. Alternatively or additionally, a non-GNSS based radio positioning system may make use of existing radio devices like WLAN access points or cellular network nodes as positioning support radio devices.

In the subsequent training stage, positioning data are collected. The data may be collected in the form of radio fingerprint observation reports that are based on measurements by mobile devices. A radio fingerprint observation report may indicate an observation position and radio signal parameters obtained as a result of measurements taken from the radio interface when scanning for observable radio signals at the observation position. The observation position may be for example GNSS based, sensor-based, or manually inputted. Measurements taken from the radio interface may comprise, by way of example, measured received signal strengths and identifiers of radio devices (e.g. Bluetooth beacons, WLAN access points, base stations of a cellular network) transmitting the radio signals observable at the observation position. The training may be a continuous background process, in which mobile devices of a large number of consumers are continuously reporting collected fingerprint observation reports to a server. Consumers may consent to a participation in such a radio fingerprint observation report collection, if their device is equipped with the needed functionality. This approach is also referred to as crowd-sourcing. Since crow-sourcing is a background process that does not directly benefit the device user, it is desirable that the crowd-sourcing process only consumes limited resources of the device.

Alternatively or additionally, mobile devices may be used for collecting radio fingerprint observation reports in a systematic manner. Collected reports may be uploaded to a database in a positioning server or in a positioning cloud, where algorithms may be run to generate radio models of positioning support devices (e.g. Bluetooth beacons, WLAN access points, base stations of a cellular network) and/or radio maps for positioning purposes.

In the positioning stage, a mobile device may estimate its current position based on own measurements taken from the radio interface and on information or a subset of information that is available from the training stage. Radio model information or radio map information that has been generated in the training stage may be provided to mobile devices by a positioning server via the Internet as assistance information for use in position estimation. Alternatively, radio model information and/or radio map information may be stored in a positioning server to which the mobile devices may connect to via the Internet for obtaining a position estimate.

SUMMARY OF SOME EMBODIMENTS OF THE INVENTION

Non GNSS-based radio positioning systems (e.g. Bluetooth, WLAN and cellular based radio positioning systems) as disclosed above may be affected by manipulating radio signals that are used for positioning purposes during the positioning stage. Manipulation techniques may for example be spoofing or jamming of such radio signals:

Spoofing of radio signals may be considered to relate to a deliberate attempt to deceive a mobile device by falsifying radio signals structured to resemble one or more authentic radio signals. This may for example be done by transmitting (e.g. broadcasting) one or more manipulated (e.g. falsified) radio signals or by retransmitting (e.g. rebroadcasting) authentic radio signals captured at a different position and/or time. Alternatively, a spoofing malware running on the mobile device may falsify scanning results (e.g. as scanning results obtained radio signal parameters) when the mobile device scans for observable radio signals for estimating its position, wherein this spoofing malware may be a fake location framework running on the mobile device. Such falsified (i.e. "spoofed") radio signals or scanning results may be used to cause the mobile device to determine its position to be somewhere other than where it actually is.

Jamming of radio signals may be considered to relate a deliberate attempt to disrupt scanning for one or more radio signals by a mobile device, for example by transmitting radio signals and/or radio noise interfering the one or more radio signals.

Jamming of radio signals may also occur unintentionally by the signals from the near-by radios sources signals of which mix in the receiver's RF front-end into in-band interference.

Such manipulation techniques are a threat to business models which rely on trustworthy positioning like car sharing services. It is inter-alia an object of the present invention to improve the above disclosed non-GNSS based radio positioning systems to enable mitigating the threat associated with such manipulation techniques.

According to an exemplary aspect of the invention, a method is disclosed, which comprises maintaining a database comprising information identifying of one or more mobile devices, wherein each mobile device of the one or more mobile devices is configured to enable positioning based on radio signals and wherein said positioning enabled by the respective mobile device is considered to be at least partially unexpected.

The method according to the exemplary aspect of the invention may, for example, at least partially be performed by an apparatus, wherein the apparatus may be a mobile device or a component of a mobile device or a server or a cloud component.

According to the exemplary aspect of the invention, furthermore, an apparatus is disclosed, which comprises means for at least partially realizing the method according to the exemplary aspect of the invention. The means of the apparatus may be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means such as a processor and a memory. Optionally, the apparatus may comprise various other components, like a radio interface, a data interface, a user interface etc.

For example, the apparatus comprises at least one processor and at least one memory including computer program code, the at least one memory and the computer program code configured to, with the at least one processor, cause an apparatus at least to perform at least partially the method and/or the steps of the method according to the exemplary aspect of the invention.

According to the exemplary aspect of the invention, furthermore, a system is disclosed, which comprises the apparatus.

A mobile device (e.g. any mobile device) of the one or more mobile devices may be an Internet-of-Thing (IoT) device, a smart home device, a smartphone, a tablet computer, a notebook computer, a smart watch, and a smart band.

For example, the disclosed method may be part of a non-GNSS based radio positioning system as disclosed above. The mobile device may be enabled for or support such a non-GNSS based radio positioning system. This may be understood to mean that the mobile device is configured to estimate (e.g. determine) or to cause estimating (e.g. determining) its position at least partially based on radio signal parameters of one or more radio signals (e.g. one or more terrestrial radio signals) obtained at this position (e.g. obtained as a scanning result of scanning for observable radio signals at this position). Estimating (e.g. determining) of a position of the mobile device at least partially based on (a) radio signal parameter(s) may be understood to mean that the estimating is performed as a function of the radio signal parameter(s). It is however to be understood that the estimating may optionally depend on further information like a radio map. For example, such a radio map may be configured to enable mobile devices to estimate their position at least partially based on this radio map when the mobile devices are located in the area covered by the radio map. For example, the radio map is represented by radio map information which may be provided (e.g. transmitted) by a positioning server to the mobile device and/or which may be hold available by the mobile device (e.g. stored in memory means of the mobile device(s)). For example, the radio map contains or represents a respective radio model for a plurality of radio devices transmitting (e.g. broadcasting) radio signals that are observable within the area covered by the radio map. If the radio map covers a building, the radio map may contain or represent, for each floor of the building, a respective radio model for a plurality of radio devices transmitting (e.g. broadcasting) radio signals that are observable on the respective floor of the building.

A respective radio model for a respective radio device of the plurality of radio devices may be understood to represent at least the expected radio coverage of the respective radio device (e.g. on a certain floor of a building). For example, the radio model of such a radio device may describe the coverage area (e.g. on a certain floor of a building) within which radio signals transmitted or triggered to be transmitted by this radio device are expected to be observable. An example for such a radio model is a radio image representing an expected radio signal strength field of the radio signals transmitted or triggered to be transmitted by this radio device. The real radio coverage of such a radio positioning support device may however deviate from the expected radio coverage as described by such a radio model. As disclosed above, the radio map may be determined by the positioning server during the training stage of the non-GNSS based radio positioning system. Causing of estimating (e.g. determining) of a position of a mobile device at least partially based on the radio signal parameter(s) may be understood to mean that the radio signal parameter(s) are provided (e.g. transmitted) by the mobile device to the positioning server to cause the positioning server to estimate (e.g. determine) a position of the mobile device at least partially based on the radio signal parameter(s).

The one or more radio signals may be terrestrial radio signals. Examples of such a terrestrial radio signal are a Bluetooth signal, a Bluetooth Low Energy (BLE) signal, a cellular network signal or a Wireless Local Area Network (WLAN) signal. The Bluetooth standards are specified by the Bluetooth Special Interest Group and are presently available under https://www.bluetooth.com/. A cellular network may for example be mobile phone network like a 2G/3G/4G/5G cellular communication network. The 2G/3G/4G/5G cellular radio communication standards are developed by the 3GPP and presently available under http://www.3gpp.org/. WLAN is for example specified by the standards of the IEEE 802.11 family (http://www.ieee.org/).

A radio signal parameter of a certain radio signal may for example be obtained by the mobile device as a scanning result when scanning for observable radio signals at a certain position (e.g. for estimating its position). Therein, a radio signal may be understood to be observable at a certain position if the radio signal is receivable with a minimum quality (e.g. a minimum signal-to-noise ratio and/or a minimum signal power, e.g. at least −90 dbm or −95 dbm) at this position. For example, the mobile device may determine at least one respective radio signal parameter for each radio signal observed when scanning for radio signals at a certain position. The determined radio signal parameters may then for example be obtained as scanning results.

A radio signal parameter of a certain radio signal may be understood to be at least one of (1) an information (e.g. an identifier) contained in the radio signal and (2) a representation (e.g. an indicator or a value) of a physical quantity (e.g. a received signal strengths) of the radio signal. Accordingly, a radio signal parameter may be determined by at least one of (1) extracting information contained in the radio signal and (2) measuring a physical quantity (e.g. a received signal strength) of the radio signal.

For example, the mobile device may scan for observable radio signals at the first position and the second position for estimating its position (e.g. based on a non-GNSS based radio positioning system as disclosed above). The one or more first radio signal parameters and the one or more second radio signal parameters may then be obtained as scanning results. As discussed above, a spoofing malware running on the mobile device may falsify such scanning results and/or a spoofed radio signals (e.g. spoofed radio parameters) may falsify such scanning results which might lead to manipulated positioning enabled by the mobile device.

According to this aspect of the invention a database is maintained comprising information identifying of one or more mobile devices, wherein each mobile device of the one or more mobile devices is configured to enable positioning based on radio signals and wherein said positioning enabled by the respective mobile device is considered to be at least partially unexpected.

Thus, as an example, this database comprising information identifying of one or more mobile devices, wherein each mobile device of the one or more mobile devices is configured to enable positioning based on radio signals and wherein said positioning enabled by the respective mobile device is considered to be at least partially unexpected, may be used to provide information that a mobile device of the one or more mobile devices is considered to be a "spoofed" device with respect to the positioning enabled by the respective mobile device since the positioning enabled by the respective mobile device is considered to be at least partially unexpected.

Therefore, the database maintained by apparatus may be considered to represent a blacklist of the one or more mobile devices being identified by the information of the database since each of the one or more mobile devices can be considered to be a spoofed device with respect to positioning enabled by the respective mobile device.

Thus, as an example, the database maintained by the apparatus can be considered to be a collection of one or more spoofed mobile devices and the information comprised in this database may be used to indicate that the one or more spoofed mobile devices being identified by the information is a not trustworthy mobile device with respect to positioning.

This information of the database identifying one or more mobile devices may be useful, e.g. in order to inform a location based service that a mobile device being identified by the information comprised in the database shall not be trust with respect to positioning, e.g. that a position estimation provided by the mobile device and/or a position estimation obtained by radio measurements of the mobile device is considered to be potentially manipulated.

As an example embodiment, the database maintained by the apparatus (i.e., the database comprising information identifying of one or more mobile devices) may be encrypted, e.g. in order to perform one or more of the following:

Avoid/block malicious attempts to manipulate the database contents,

Ensure that only the authenticated party/entity is able to access the data in the database.

Furthermore, as an example, the database may also comprise the radio map. Then, the radio map may als by encrypted, e.g. in order to limit access to the WLAN access points and/or BLE and/or cell identifiers due to privacy reasons.

As an example embodiment, said one or more mobile devices (identified by the information in the database) are a plurality of mobile devices.

As an example embodiment, said positioning enabled by the respective device is considered to be at least partially unexpected if the positioning enabled by the respective device is considered to be potentially manipulated, in particular that a position estimated by said positioning is considered to be unexpected.

As an example embodiment, said maintaining a database comprises obtaining information regarding a respective mobile device, wherein positioning enabled by the respective mobile device is considered to be at least partially unexpected, and including an information identifying this mobile device in the database.

As an example embodiment, said obtaining information regarding a respective mobile device comprises receiving said information regarding the respective mobile device from the mobile device.

For instance, said system may comprise the apparatus and the respective mobile device.

As an example embodiment, said obtaining information regarding a mobile device comprises receiving said information from a server or a cloud component, in particular from a cloud application interface.

For instance, said system may comprise the apparatus and the server or cloud component.

As an example embodiment, the aspect of the invention comprises, for each mobile device of at least one mobile device of the one or more mobile devices, providing information identifying the respective mobile device to at least one location based service.

As an example embodiment, the aspect of the invention comprises, for each mobile device of at least one mobile device of the one or more mobile devices being identified by the database: (i) determining whether positioning enabled by the respective mobile device is still considered to be unexpected, and (ii) removing the information identifying the respective mobile device from the database if it is determined that the respective mobile device is not still considered to be unexpected.

As an example embodiment, if it is determined that the respective mobile device is not still considered to be unexpected, information identifying the respective mobile device is provided to at least one location based service.

As an example embodiment, said determining whether positioning enabled by the respective mobile device is still considered to be unexpected comprises: obtaining status information regarding the respective mobile device, the status information being indicative whether the positioning enabled by the respective device is considered to be at least partially unexpected or not.

As an example embodiment, said obtaining status information regarding the respective mobile device comprises receiving said status information from a server or cloud component, in particular from a cloud application interface.

For instance, said system may comprise the apparatus and the server or cloud component.

As an example embodiment, said obtaining status information regarding the respective mobile device comprises receiving said status information from the respective mobile device.

As an example embodiment, the aspect of the invention comprises revoking a positioning license associated with a mobile device at least for a predetermined period of time if the mobile device is identified by the database comprising information identifying of one or more mobile devices.

As an example embodiment, the aspect of the invention comprises determining by the server or the cloud component if the positioning enabled by the respective mobile device is considered to be at least partially unexpected, wherein, in particular, said determining if the positioning enabled by the respective mobile device is considered to be at least partially unexpected is performed by a positioning component of the server or the cloud component.

As an example embodiment, the aspect of the invention comprises determining by the respective mobile device if the positioning of the respective mobile device is considered to be at least partially unexpected.

As an example embodiment, said determining by the respective mobile device if the positioning of the respective mobile device is considered to be at least partially unexpected is performed based on at least one of: (i) usage of different radio technologies and/or different frequency bands for positioning by the respective mobile device; (ii) usage of a signed location estimate created by a positioning engine of the respective mobile device.

As an example embodiment, the respective mobile device is configured to determine if the positioning of the respective mobile device is considered to be at least partially unexpected based on determining whether at least one unexpected radio signal parameter of a radio communication system used for positioning is obtained and/or at least one unexpected radio signal of a radio communication system used for positioning is received at the respective mobile device.

As an example embodiment, said determining whether at least one unexpected radio signal parameter of a radio communication system used for positioning is obtained and/or at least one unexpected radio signal of a radio communication system used for positioning is received at the respective mobile device is performed based on at least one of: (i) sensor information indicating a movement of the respective mobile device from a first position to a second position; (ii) a comparison between a radio map and at least radio signal parameter received by the respective mobile device.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
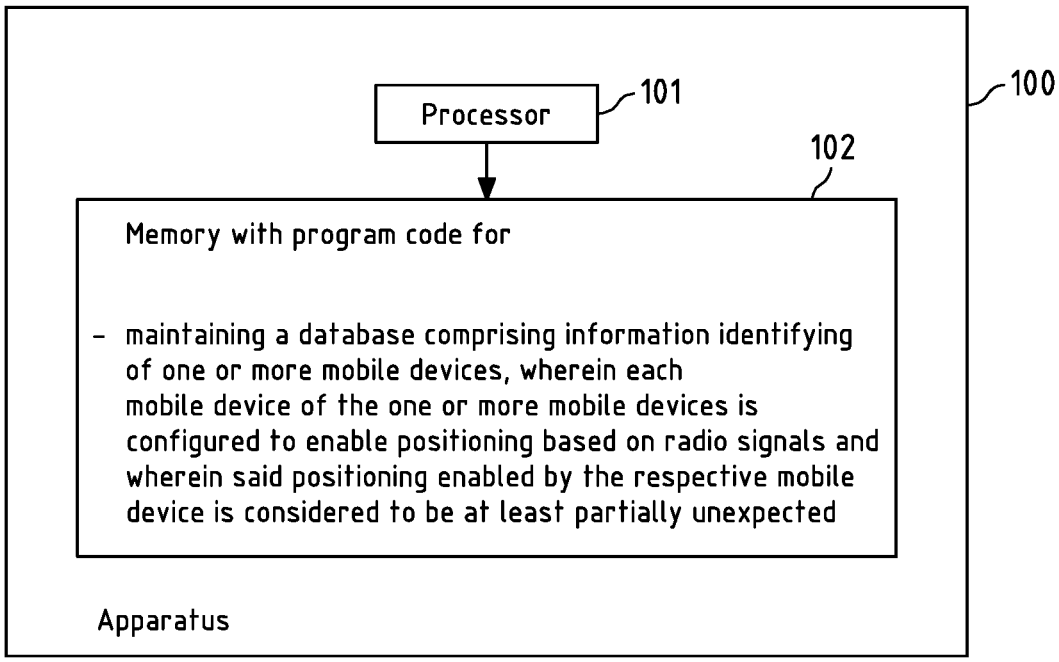
FIG. 1 is a schematic block diagram of an example embodiment of an apparatus according to the invention.

FIG. 1 is a schematic block diagram of an example embodiment of an apparatus according to the invention. Apparatus 100 comprises a processor 101 and, linked to processor 101, a memory 102. Memory 102 stores computer program code for holding available data associated with at least one road segment and for providing safety data. Processor 101 is configured to execute computer program code stored in memory 102 in order to cause an apparatus to perform desired actions. Memory 102 is thus an example embodiment of a non-transitory computer readable storage medium, in which computer program code according to the invention is stored. For instance, memory 102 may store computer program code for maintaining a database comprising information identifying of one or more mobile devices, wherein each mobile device of the one or more mobile devices is configured to enable positioning based on radio signals and wherein said positioning enabled by the respective mobile device is considered to be at least partially unexpected.

Apparatus 100 could be a server or a cloud component or any other kind of mobile or stationary device. For instance, said apparatus 100 may represent a plurality of apparatus are used, wherein each apparatus may comprise a processor 101, and linked to processor 101, a memory 102, wherein memory 102 at least partially stores computer program code for maintaining a database comprising information identifying of one or more mobile devices, wherein each mobile device of the one or more mobile devices is configured to enable positioning based on radio signals and wherein said positioning enabled by the respective mobile device is considered to be at least partially unexpected. For instance, said plurality of apparatus may represent servers in a cloud interaction together in order to hold available data associated with at least one road segment and to providing safety data.

Apparatus 100 could equally be a component, like a chip, circuitry on a chip or a plug-in board, for any server, mobile or stationary device. Optionally, apparatus 100 could comprise various other components, like a data interface configured to enable an exchange of data with separate devices, a user interface like a touchscreen, a further memory, a further processor, etc.

An operation of the apparatus 100 will now be described with reference to the flow chart 200' of FIG. 2a. The operation is an example embodiment of a method according to the invention. At least one processor 101 (may be one processor 101 or a plurality of processors 101) and the program code stored in at least one memory 102 (may be one memory 102 or a plurality of memories 102) cause at least one apparatus (may be one apparatus ore a plurality of apparatuses) to perform the operation when the program code is retrieved from memory 102 and executed by processor 101. The at least one apparatus that is caused to perform the operation can be apparatus 100 or some other apparatus, for example but not necessarily a device comprising apparatus 100.

The apparatus 100 maintains a database comprising information identifying of one or more mobile devices, wherein each mobile device of the one or more mobile devices is configured to enable positioning based on radio signals and wherein said positioning enabled by the respective mobile device is considered to be at least partially unexpected (action 210 of method 200).

Thus, as an example, this database comprising information identifying of one or more mobile devices, wherein each mobile device of the one or more mobile devices is configured to enable positioning based on radio signals and wherein said positioning enabled by the respective mobile device is considered to be at least partially unexpected, may be used to provide information that a mobile device of the one or more mobile devices is considered to be a "spoofed" device with respect to the positioning enabled by the respective mobile device since the positioning enabled by the respective mobile device is considered to be at least partially unexpected.

Therefore, the databased maintained by apparatus 100 may be considered to represent a blacklist of the one or more mobile devices being identified by the information of the database since each of the one or more mobile devices can be considered to be a spoofed device with respect to positioning enabled by the respective mobile device.

For example, each of mobile devices of the one or more mobile devices may be one of a smartphone, a tablet computer, a notebook computer, a smart watch and a smart band. Mobile devices may be enabled for or support non-GNSS based radio positioning system, e.g. the example of a non-GNSS based radio positioning system 200' depicted in FIG. 2b. E.g., the one or more mobile devices may be plurality of mobile devices.

For instance, said positioning enabled by the respective device of the one or more mobile devices identified by the information of the database is considered to be at least partially unexpected if the positioning enabled by the respective device is considered to be potentially manipulated, in particular that a position estimated by said positioning is considered to be unexpected. E.g., a position estimated by said positioning may be considered to be unexpected if the estimated position of the respective mobile device deviates from a correct position of the respective mobile device more than a predefined threshold, but also other criteria may be used, e.g. if the estimated position of the respective mobile device is not within the coverage area of the beacons transmitting radio signals to the mobile device for positioning.

Figure 2A:
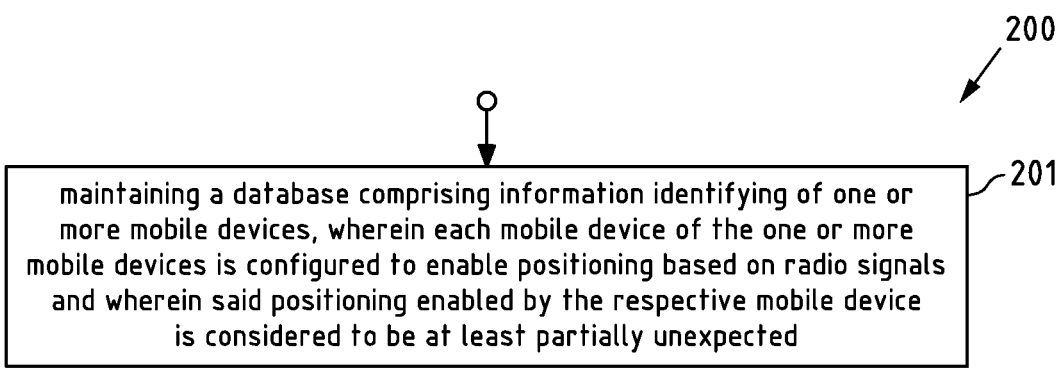
FIG. 2a is a flow chart illustrating an example embodiment of a method 200 according to the invention (which may represent an example operation in the apparatus of FIG. 1)
Figure 2B:
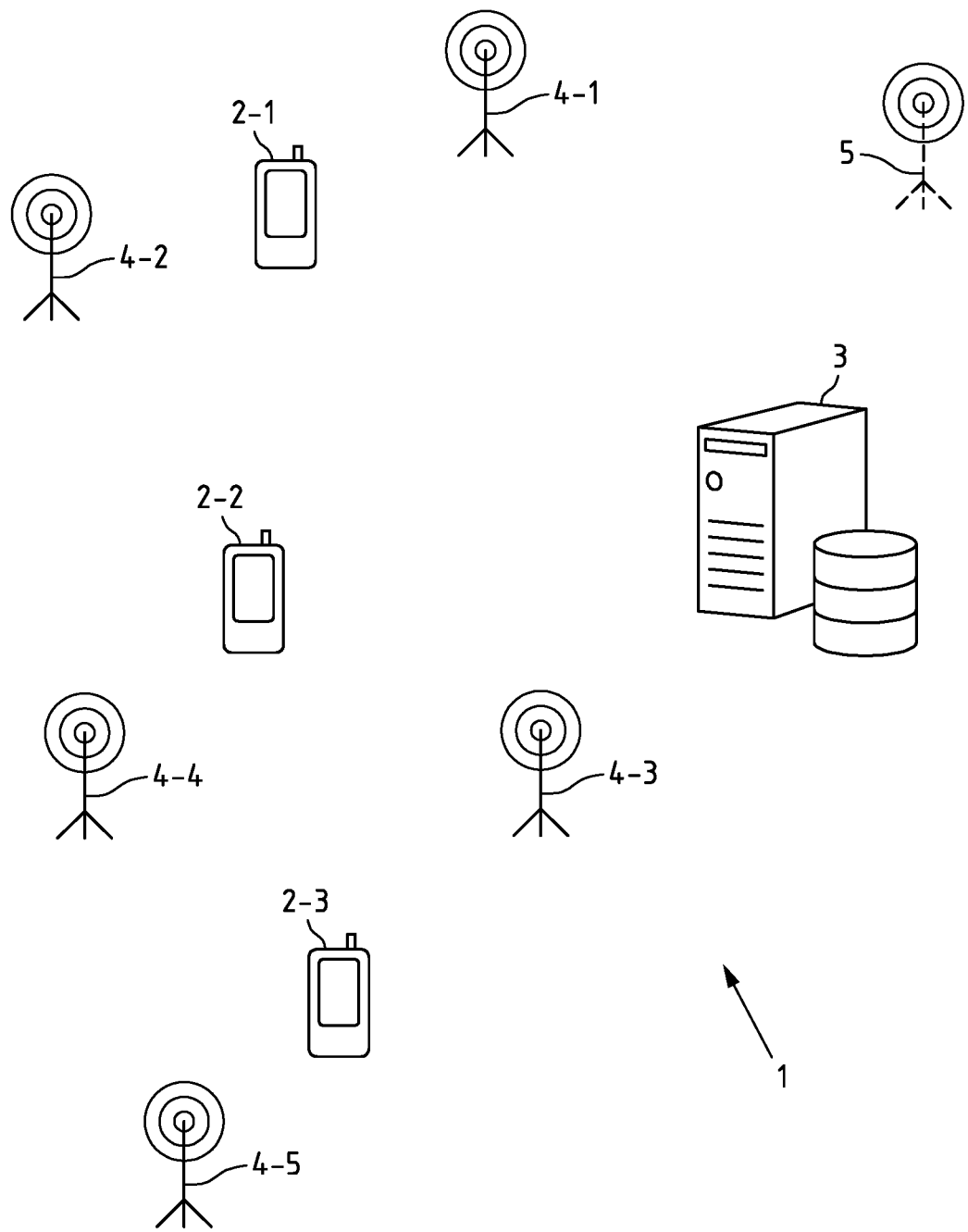
FIG. 2b is a block diagram of an exemplary embodiment of a system according to the invention.

Examples of such manipulations will now be presented with respect to FIG. 2b which depicts a schematic high-level block diagram of a system 200' according to an exemplary aspect of the invention. In the following, it is assumed that system 200' is a non-GNSS based radio positioning system for a predetermined environment like a building or a complex of buildings (e.g. a shopping center, a parking garage, an airport, a company site, etc).

For example, each of mobile devices 2-1 to 2-3 may be one of a smartphone, a tablet computer, a notebook computer, a smart watch and a smart band. Mobile devices 2-1 to 2-3 may be enabled for or support non-GNSS based radio positioning system 200'.

System 200' comprises a server 3, which might be a positioning server 3, and a plurality of optional radio devices 4-1 to 4-5.

System 200' is not limited to a single server 3, but may optionally comprise a plurality of servers (e.g. forming a server cloud). Accordingly, server 3 may be part of such a plurality of servers (e.g. a server cloud) or may be represented by such a plurality of servers (e.g. a server cloud).

For exemplary purposes and without limiting the scope of the invention, it is assumed in the following that radio devices 4-1 to 4-5 are dedicated position support radio devices in the form of BLE beacons 4-1 to 4-5 fixedly installed in the predetermined environment of system 200'. However, system 200' may comprise further radio devices or BLE beacons. In the following, it is thus referred to BLE beacons 4-1 to 4-5 without limiting the scope of the invention. As disclosed below in more detail, each of BLE beacons 4-1 to 4-5 may be configured to automatically and repeatedly transmit a respective BLE radio signal like an advertisement signal. The BLE radio signals transmitted by radio devices 4-1 to 4-5 may contain and/or represent positioning support information which are configured to enable mobile devices 2-1 to 2-3 to estimate their position at least partially based on this positioning support information. An example of such positioning support information is an identifier like an UUID of the respective one of radio devices 4-1 to 4-5 transmitting the respective radio signal containing this positioning support information.

In the training stage of system 200', mobile devices like mobile devices 2-1 to 2-3 may collect radio fingerprint observation reports indicating an observation position within the predetermined environment and the UUIDs contained in or represented by the BLE radio signals transmitted by BLE beacons 4-1 to 4-5 observable at the observation position. The collected radio fingerprint observation reports may be provided (e.g. transmitted) by the mobile devices to server 3 for determining a radio map.

For example, the radio map may be configured to enable mobile devices 2-1 to 2-3 to estimate their position at least partially based on this radio map when the mobile devices are located within the predetermined environment of system 200' (i.e. the area covered by the radio map). For example, the radio map is represented by radio map information which may be provided (e.g. transmitted) by a positioning server 1 to mobile devices 2-1 to 2-3 and/or which may be hold available by mobile device 2-1 to 2-3 (e.g. stored in a memory of mobile devices 2-1 to 2-3). For example, the radio map contains or represents a respective radio model for each of BLE beacons 4-1 to 4-5. Moreover, the radio map may represent the respective installation position of each of BLE beacons 4-1 to 4-5. As disclosed above, a respective radio model for a respective BLE beacon of BLE beacons 4-1 to 4-5 may be understood to represent at least the expected radio coverage of the respective radio device. For example, the radio model of such a BLE beacon may at least describe the coverage area within which radio signals transmitted by this radio device are expected to be observable.

In the positioning stage, mobile devices 2-1 to 2-3 may use the radio map to determine their position at least partially based on radio signal parameters of observable radio signals. For example, if mobile device 2-1 obtains radio signal parameters (e.g. UUIDs, received signal strength value/indicator, etc.) of three BLE radio signals transmitted by BLE beacons 4-1, 4-2 an 4-3 when scanning for observable radio signals at its present position, it may for example determine (e.g. estimate) by use of the radio map that its presents position is within the overlapping region of the coverage areas described by the radio models of BLE beacons 4-1, 4-2 an 4-3.

As discussed above, for example, non GNSS-based radio positioning systems like system 200' may be affected by manipulating radio signals that are used for positioning purposes during the positioning stage. Manipulation techniques may for example be spoofing or jamming of such radio signals as described above in more detail. For example, an attacker may install a spoofing radio device 5 in a certain area to deceive mobile devices 2-1 to 2-3 to cause them to determine to be located within the overlapping region of the coverage areas described by the radio models of BLE beacons 4-1, 4-2 an 4-3. The spoofing radio device 5 may be configured to (e.g. automatically and/or repeatedly) transmit spoofed BLE radio signals containing or representing the UUIDs of BLE beacons 4-1, 4-2 an 4-3. If mobile devices 2-1 to 2-3 determine their position at least partially based on radio signal parameters of these spoofed BLE radio signals, they may determine (e.g. estimate) their position to be within the overlapping region of the coverage areas described by the radio models of BLE beacons 4-1, 4-2 an 4-3 even though they may be located in an entirely different area. Therefore, each of these mobile devices 2-1 to 2-3 is a mobile device 2-1, 2-2, 2-3 configured to enable positioning based on radio signals (e.g. the BLE radio signals) and, for instance, in this example, the positioning enabled by the respective device (based on the radio signals) is considered to be at least partially unexpected since the position determined at least partially based on the on radio signal parameters of these spoofed BLE radio signals is not correct and thus can be considered to unexpected and be potentially manipulated. For instance, this spoofing may be considered to be imposed externally to the respective mobile device 2-1 to 2-3 since the at least some of the radio signals received at the mobile device 2-1 to 2-3 are spoofed.

Or, as discussed above, as another example, a mobile device 2-1, 2-2, 2-3 may be manipulated such that the mobile device determines an incorrect position based on authentic (i.e., non-spoofed or non-falsified) radio signals containing or representing the UUIDs of BLE beacons 4-1, 4-2 an 4-3. For instance, a fake location framework (or a manipulated location framework) may be installed in the respective mobile device 2-1, 2-2, 2-3 such that a spoofed location is outputted from the fake location framework although authentic (i.e., non-spoofed or non-falsified) radio signals are received by the respective mobile device 2-1, 2-2, 2-3.

As an example, it may be detected by the respective mobile device 2-1, 2-2, 2-3 that the positioning enabled by the respective mobile device is considered to be at least partially unexpected or, as another example, it may be detected by another entity being different from the respective mobile device 2-1, 2-2, 2-3 that the positioning enabled by the respective mobile device is considered to be at least partially unexpected, wherein, for example, this other entity may be apparatus 100, server 3 in FIG. 2b or any other server or a cloud component.

Thus, the database maintained (action 210) by the apparatus 100 (e.g. server 3) can be considered to be a collection of one or more spoofed mobile devices 2-1, 2-2, 2-3 and the information comprised in this database may be used to indicate that the one or more spoofed mobile devices 2-1, 2-2, 2-3 being identified by the information is a not trustworthy mobile device with respect to positioning.

This information may be useful, e.g. in order to inform a location based service in the system 200' that a mobile device being identified by the information comprised in the database shall not be trust. For instance, apparatus 100 or server 3 may be configured to provide, for each mobile device 2-1, 2-2, 2-3 of at least one mobile device of the one or more mobile devices identified by the information comprised in the database, information identifying the respective mobile device to at least one location based service. For instance, a location based service of the at least one location based service may performed by apparatus 100 or server 3, or it may be performed by another server in system 200' (not depicted in FIG. 2b), or it may be performed by a mobile device in system 200', e.g. by a mobile device 2-1, 2-2, 2-3 or by a mobile device not being depicted in FIG. 2b.

As an example embodiment, the database maintained by the apparatus 100 (i.e., the database comprising information identifying of one or more mobile devices) or by server 3 may be encrypted, e.g. in order to perform one or more of the following:

Avoid/block malicious attempts to manipulate the database contents,

Ensure that only the authenticated party/entity is able to access the data in the database.

Furthermore, the radio map which may be stored in apparatus 100 or in server 3 may also be encrypted, e.g. in order to limit access to the WLAN access points and/or BLE and/or cell identifiers due to privacy reasons. For instance, the radio map be part of the databased maintained by the apparatus 100 or server 3.

Figure 3A:
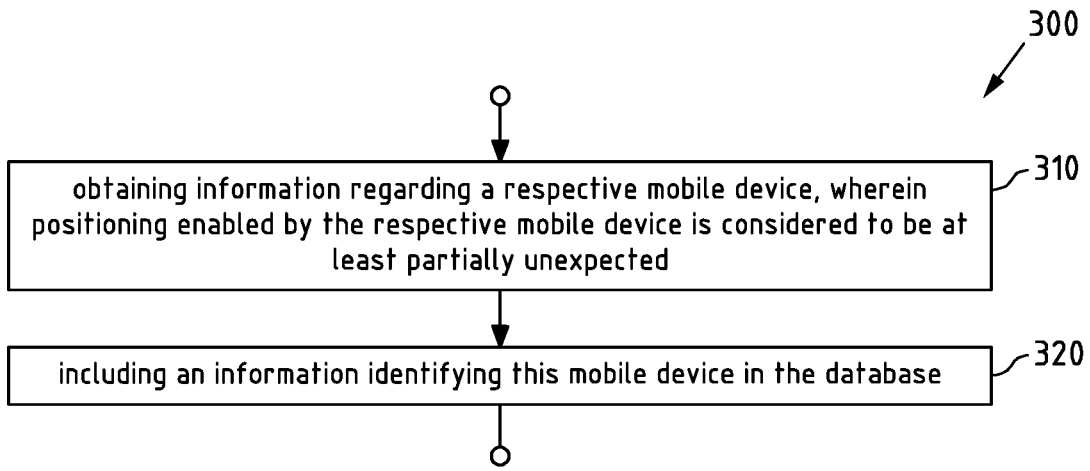
FIG. 3a is a flow chart illustrating an exemplary embodiment of a method 300 according to the invention.

FIG. 3a is a flow chart 300 illustrating an exemplary embodiment of a method according to the invention. Without limiting the scope of the invention, it is assumed in the following that the apparatus 100 as described above with respect to FIG. 1 or the server 3 as described above with respect to FIG. 2b performs the steps of flow chart 300.

Method 300 comprises obtaining information regarding a respective mobile device, wherein positioning enabled by the respective mobile device is considered to be at least partially unexpected (action 310).

Thus, this obtained information regarding the respective mobile device indicates that the positioning enabled by the respective mobile device 2-1, 2-2, 2-3 is considered to be at least partially unexpected.

For instance, the information may be obtained from apparatus 100 or server 3, i.e., e.g., the apparatus 100 or server 3 may be configured to determine whether positioning enabled by the respective mobile device 2-1, 2-2, 2-3 is considered to be at least partially unexpected or not, and if yes, the apparatus 100 or server 3 obtains the information regarding a respective mobile device, wherein positioning enabled by the respective mobile device is considered to be at least partially unexpected, in action 310.

Figure 3B:
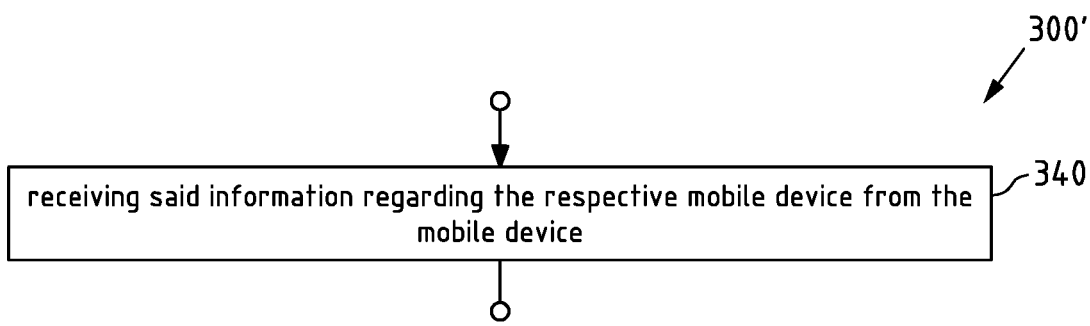
FIG. 3b is a flow chart illustrating an exemplary embodiment of a method 300' according to the invention.

Or, as another example, it may be detected by the respective mobile device 2-1, 2-2, 2-3 that the positioning enabled by the respective mobile device is considered to be at least partially unexpected. Then, for example, action 310 may comprise receiving said information regarding the respective mobile device from the respective mobile device, e.g. via an internet connection and/or a wireless connection (e.g. based on Bluetooth or Wifi), as exemplarily described by action 340 of method 300' depicted in FIG. 3b (i.e., action 340 of method 300' may be part of action 310 of method 300). I.e., said obtaining information regarding the respective mobile device indicated that the positioning enabled by the respective mobile device 2-1, 2-2, 2-3 is considered to be at least partially unexpected may comprise receiving said information regarding the respective mobile device from the respective mobile device.

Figure 3C:
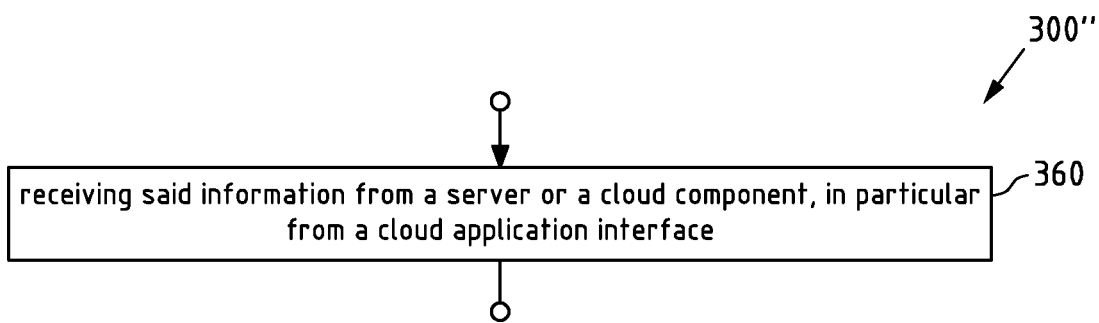
FIG. 3c is a flow chart illustrating another exemplary embodiment of a method 300" according to the invention.

Or, as another example, it may be detected by another entity being different from the respective mobile device 2-1, 2-2, 2-3 (i.e. the mobile device for which positioning enabled by the respective mobile device is considered to be at least partially unexpected) and being different from the apparatus 100 and/or server 3 that the positioning enabled by the respective mobile device 2-1, 2-2, 2-3 is considered to be at least partially unexpected, wherein, for example, this other entity may any other server or a cloud component. Then, for example, action 310 may comprise receiving said information regarding the respective mobile device from a server or a cloud component, e.g. via an internet connection and/or a wireless connection (e.g. based on Bluetooth or Wifi) as exemplarily described by action 360 of method 300" depicted in FIG. 3c (i.e., action 360 of method 300" may be part of action 310 of method 300). I.e., said obtaining information regarding the respective mobile device indicated that the positioning enabled by the respective mobile device 2-1, 2-2, 2-3 is considered to be at least partially unexpected may comprise receiving said information from a server (e.g. the other server) or a cloud component, wherein in case of the cloud component this information may be received from a cloud application interface.

In action 320 of method 300 an information identifying the respective mobile device (i.e., the mobile device identified by the information obtained in action 310) is included in the database. For instance, by method 300 the database can be updated, in particular by means of updating the information identifying of one or more mobile devices, wherein each mobile device of the one or more mobile devices is configured to enable positioning based on radio signals and wherein said positioning enabled by the respective mobile device is considered to be at least partially unexpected, such that the respective mobile device being identified by the information obtained in action 310 is included in the database by means of action 320.

Figure 4:
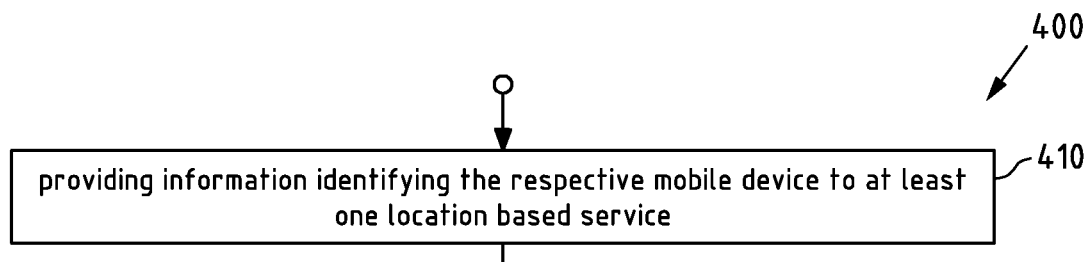
FIG. 4 is a flow chart illustrating an exemplary embodiment of a method 400 according to the invention.

FIG. 4 is a flow chart 400 illustrating an exemplary embodiment of a method according to the invention. Without limiting the scope of the invention, it is assumed in the following that the apparatus 100 as described above with respect to FIG. 1 or the server 3 as described above with respect to FIG. 2b performs the steps of flow chart 400.

Method 400 comprises, for each mobile device of the at least one mobile device of the one or more mobile devices identified by the information of the database, providing information identifying the respective mobile device to at least one location based service (action 410).

Thus, for instance, at least one location based service in the system 200' can be informed that the mobile device being identified by the information provided in action 410 is a mobile device for which positioning enabled by the respective mobile device is considered to be at least partially unexpected. Accordingly, the information maintained in the database (action 210) can be at least partially (or e.g. completely) shared with the at least one location based service in order to inform the at least one location based service that the respective mobile device of the at least one mobile device of the one or more mobile devices for which information identifying the respective mobile device is provided to the at least one location based service (action 410) may be considered to be potentially manipulated. Then, for instance, the respective mobile device of the at least one mobile device of the one or more mobile devices for which information identifying the respective mobile device is provided to the at least one location based service may be blocked and/or blacklisted from a location of the at least one location based service in order to prevent the service from causing problems and/or financial losses due to incorrect positioning performed by the respective mobile device.

For instance, a location based service of the at least one location based service may performed by apparatus 100 or server 3, or it may be performed by another server in system 200' (not depicted in FIG. 2b), or it may be performed by a mobile device in system 200', e.g. by a mobile device 2-1, 2-2, 2-3 or by a mobile device not being depicted in FIG. 2a.

As an example, providing information identifying the respective mobile device 2-1, 2-2, 2-3 to at least one location based service (action 410) may comprise transmitting the information identifying the respective mobile device 2-1, 2-2, 2-3 to a location based service of the at least one location based service from apparatus 100 (or server 3) to an entity performing this location based service via a network, e.g. the Internet, wherein the network may comprise a wireless network, e.g. comprising Bluetooth or Wifi. Thus, the at least one location based service may be informed about one or more mobile devices 2-1, 2-2, 2-3 for which positioning enabled by the mobile devices 2-1, 2-2, 2-3 is considered to be at least partially unexpected based on the database maintained in action 210 and based on the information provided during action 410.

Figure 5A:
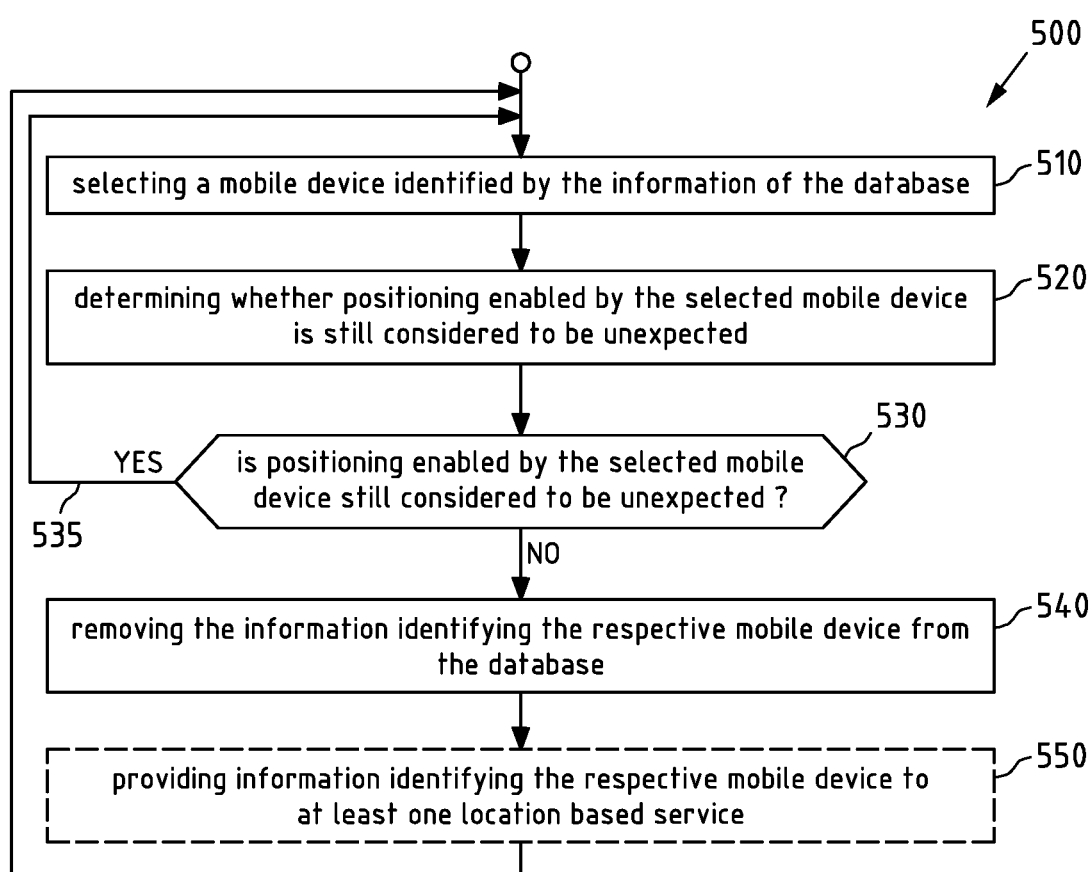
FIG. 5a is a flow chart illustrating an exemplary embodiment of a method 500 according to the invention.

FIG. 5 is a flow chart 500 illustrating an exemplary embodiment of a method according to the invention. Without limiting the scope of the invention, it is assumed in the following that the apparatus 100 as described above with respect to FIG. 1 the server 3 as described above with respect to FIG. 2b performs the steps of flow chart 500.

Method 500 comprises selecting a mobile device 2-1, 2-2, 2-3 identified by the information of the database (action 510). The database maintained in action 210 comprises information identifying one or more mobile devices 2-1, 2-2, 2-3. Thus, the mobile device 2-1, 2-2, 2-3 selected in action 510 is a mobile device of the one or more mobile devices 2-1, 2-2, 2-3 identified by the information of the database.

In action 520 it is determined whether positioning enabled by the selected mobile device 2-1, 2-2, 2-3 is still considered to be unexpected or not. Thus, this may be considered as a part of a review whether a mobile device identified by the database is still considered to be potentially manipulated or not.

As an example, the selected mobile device 2-1, 2-2, 2-3 may have moved from a first position in which it received at least partially spoofed radio signals (e.g. from one or more manipulated beacons) to a second position in which it now receives authentic radio signals (i.e. non-manipulated radio signals, i.e. non-spoofed or non-falsified radio signals).

Or, as another example, a fake location frame work in the selected mobile device 2-1, 2-2, 2-3 may have been removed in the meanwhile such that now the positioning enabled by the selected mobile device 2-1, 2-2, 2-3 is not manipulated anymore.

Figure 5B:
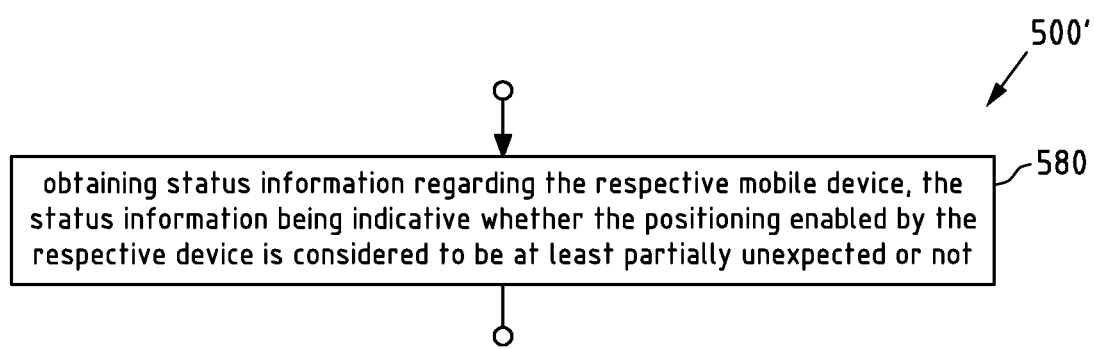
FIG. 5b is a flow chart illustrating an exemplary embodiment of a method 500' according to the invention.

Action 520 may comprise obtaining status information regarding the selected mobile device 2-1, 2-2, 2-3, the status information being indicative whether the positioning enabled by the selected device is considered to be at least partially unexpected or not, e.g. as exemplary shown by action 580 of method 500' depicted in FIG. 5b. Thus, as an example, action 580 may be part of action 520.

For instance, the status information may be obtained from apparatus 100 or server 3, i.e., e.g., the apparatus 100 or server 3 may be configured to determine whether positioning enabled by the selected mobile device 2-1, 2-2, 2-3 is still considered to be at least partially unexpected or not, and if yes, the apparatus 100 or server 3 obtains the states information regarding a selected mobile device 2-1, 2-2, 2-3, wherein the status information of the selected mobile device 2-1, 2-2, 2-3 is indicative whether positioning enabled by the selected mobile device 2-1, 2-2, 2-3 is considered to be at least partially unexpected or not.

As another example, said obtaining status information regarding the selected mobile device 2-1, 2-2, 2-3, the status information being indicative whether the positioning enabled by the selected device is considered to be at least partially unexpected or not, may comprise receiving said status information from a server or cloud component, in particular from a cloud application interface, e.g., similar or in a same way as performed in action 340 of method 300'.

Or, as another example, it may be detected by the respective mobile device 2-1, 2-2, 2-3 that the positioning enabled by the respective mobile device 2-1, 2-2, 2-3 is considered to be at least partially unexpected. Then, for example, action 310 may comprise receiving said information regarding the respective mobile device 2-1, 2-2, 2-3 from the respective mobile device 2-1, 2-2, 2-3, e.g. via an internet connection and/or a wireless connection (e.g. based on Bluetooth or Wifi) as exemplarily described by action 340 of method 300' depicted in FIG. 3b (i.e., action 340 of method 300' may be part of action 310 of method 300). I.e., said obtaining information regarding the respective mobile device 2-1, 2-2, 2-3 indicated that the positioning enabled by the respective mobile device 2-1, 2-2, 2-3 is considered to be at least partially unexpected may comprise receiving said information regarding the respective mobile device 2-1, 2-2, 2-3 from the respective mobile device 2-1, 2-2, 2-3.

In action 530 of method 500 it is checked whether the positioning enabled by the selected mobile device 2-1, 2-2, 2-3 is still considered to be unexpected or not, i.e., based on the result of determining in action 520.

If yes, there is no reason to update the database and the method 500 may go back to action 510 in order to select (e.g. another) mobile device 2-1, 2-2, 2-3 of the one or more mobile devices 2-1, 2-2, 2-3 identified by the information of the database.

If the result of checking in action 530 is negative, i.e., if it is determined that the positioning enabled by the selected mobile device 2-1, 2-2, 2-3 is not still considered to be unexpected, method 500 proceeds with removing the information identifying the respective mobile device 2-1, 2-2, 2-3 from the database in action 540. Thus, the information of the database identifying the one or more mobile devices 2-1, 2-2, 2-3 may be updated by means of removing the selected mobile device 2-1, 2-2, 2-3 from the database, e.g., from the information comprised in the database identifying the one or more mobile devices 2-1, 2-2, 2-3. Therefore, as an example, action 540 and e.g. actions 510, 520, 530 and 540 may be considered to be part of maintaining the database in action 210 of method 200 since updating the databased can be considered, at least partially, maintaining the database.

Accordingly, method 500 enables to keep the database actual.

Furthermore, as an example, method 500 may comprise providing information identifying the respective mobile device 2-1, 2-2, 2-3 to at least one location based service (optional action 550) if it is determined that the respective mobile device 2-1, 2-2, 2-3 is not still considered to be unexpected, providing information identifying the respective mobile device 2-1, 2-2, 2-3 to at least one location based service.

Therefore, by means of optional action 550 the at least one location based service can be informed on the selected mobile device 2-1, 2-2, 2-3, which was formerly considered to be a spoofed device, is no longer considered to be a spoofed device and has been removed from the database, i.e., from the information of the database identifying of one or more mobile devices 2-1, 2-2, 2-3. For instance, action 550 may comprise transmitting the information identifying the respective mobile device 2-1, 2-2, 2-3 to at least one location service from apparatus 100 (or server 3) via a network, e.g. the Internet, wherein the network may comprise a wireless network, e.g. comprising Bluetooth or Wifi. Furthermore, the information provided in action 550 may not only comprise information being indicative of the selected mobile device 2-1, 2-2, 2-3, but also information that the selected device is not considered to be potentially manipulated.

Figure 6:
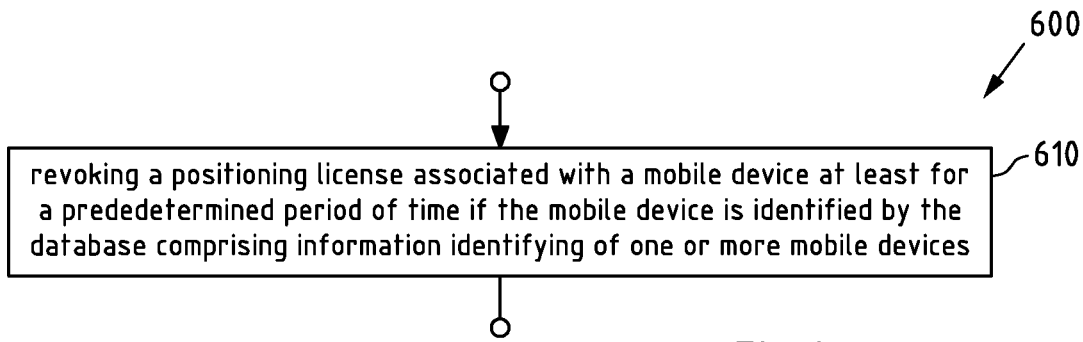
FIG. 6 is a flow chart illustrating an exemplary embodiment of a method 600 according to the invention.

FIG. 6 is a flow chart 600 illustrating an exemplary embodiment of a method according to the invention. Without limiting the scope of the invention, it is assumed in the following that the apparatus 100 as described above with respect to FIG. 1 or the server 3 as described above with respect to FIG. 2b performs the steps of flow chart 600.

Method 600 comprises revoking a positioning license associated with a mobile device 2-1, 2-2, 2-3 at least for a predetermined period of time if the mobile device 2-1, 2-2, 2-3 is identified by the database comprising information identifying of one or more mobile devices 2-1, 2-2, 2-3 (action 610). For instance, a mobile device 2-1, 2-2, 2-3 of the at least one mobile device 2-1, 2-2, 2-3 of system 200' may be associated with a positioning license, wherein the positioning license may indicate that the respective mobile device 2-1, 2-2, 2-3 is allowed to perform positioning. If a mobile device 2-1, 2-2, 2-3 is identified by the database comprising information identifying of one or more mobile devices 2-1, 2-2, 2-3, e.g., since this mobile device 2-1, 2-2, 2-3 is included in the database (e.g. by means of action 320), then this mobile device 2-1, 2-2, 2-3 may be considered to be potentially manipulated and then the positioning license associated with the mobile device 2-1, 2-2, 2-3 is revoked at least for a predetermined period of time (action 610). For instance, said predetermined period of time may be 1 hour, 2 hours, 4 hours, 1 day, 2 days or 3 days or any other well-suited predetermined period of time. Furthermore, the positioning license associated with the mobile device 2-1, 2-2, 2-3 may be revoked without any time constraints.

Figure 7A:
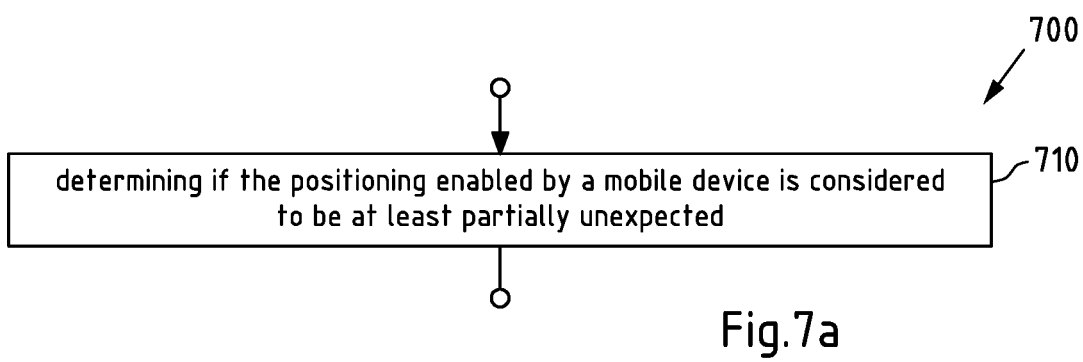
FIG. 7a is a flow chart illustrating an exemplary embodiment of a method 700 according to the invention.

FIG. 7a is a flow chart 700 illustrating an exemplary embodiment of a method according to the invention. Without limiting the scope of the invention, it may assumed in the following that the apparatus 100 as described above with respect to FIG. 1 or the server 3 as described above with respect to FIG. 2b performs the steps of flow chart 700, or that another server (e.g. of system 200') or a cloud component (e.g. of system 200) performs the steps of flow chart 700.

Method 700 comprises determining if the positioning enabled by a mobile device 2-1, 2-2, 2-3 is considered to be at least partially unexpected. Thus, it is not determined by the mobile device 2-1, 2-2, 2-3 whether the positioning enabled by the mobile device 2-1, 2-2, 2-3 is considered to be at least partially unexpected but by another entity, e.g. apparatus 100 or server 3 or another server (e.g. of system 200') or a cloud component (e.g. of system 200).

As an example, if the mobile device 2-1, 2-2, 2-3 which enables positioning is positioned using a cloud application interface (API), wherein the cloud application interface may be located in system 200', e.g. in a server, and wherein the cloud API may be considered to represent or be part of the above mentioned cloud component, and a positioning component of the cloud performing positioning of the mobile device 2-1, 2-2, 2-3 detects that the mobile device 2-1, 2-2, 2-3 is being spoofed then it is determined in action 710 that the positioning enabled by the mobile device 2-1, 2-2, 2-3 is considered at least partially unexpected. For instance, with respect to this example, the mobile device 2-1, 2-2, 2-3 may send radio measurements to the cloud application interface (which may be considered to be cloud positioning API) and the positioning component in the cloud (which may considered to be the cloud component or a part of the cloud component) may analyze the measurements against a radiomap, and if there are suspicious results, e.g. concerning the obtained position of the mobile determined by the positioning component and/or if there are suspicious radio parameters in the radio measurements sent from the mobile device 2-1, 2-2, 2-3 to the cloud API, it may be determined in action 710 that the positioning enabled by this mobile device 2-1, 2-2, 2-3 is considered to be at least partially unexpected.

Or, as another example, the cloud API and the positioning component of the cloud may be replaced by an external server (i.e., the above mentioned another server), wherein this external server is configured to receive radio measurements from the mobile device 2-1, 2-2, 2-3 in order to perform positioning of the mobile device 2-1, 2-2, 2-3, wherein the external server may analyze the measurements against a radiomap, and if there are suspicious results, e.g. concerning the obtained position of the mobile determined by the positioning component and/or if there are suspicious radio parameters in the radio measurements sent from the mobile device 2-1, 2-2, 2-3 to the external server, it may be determined in action 710 by the external server that the positioning enabled by this mobile device 2-1, 2-2, 2-3 is considered to be at least partially unexpected.

If it is determined in action 710 that the positioning enabled by the mobile device 2-1, 2-2, 2-3 is considered to be at least partially unexpected, and if action 710 is performed by the cloud component or the other (e.g. external) server, then the cloud component (e.g. the cloud API) or the other server may transmit an information regarding the respective mobile device 2-1, 2-2, 2-3 to apparatus 100 or server 3, wherein this information may be received in action 360 of method 300'. Thus, the apparatus 100 or server 3 can be informed that positioning of the respective mobile device 2-1, 2-2, 2-3 is considered to be at least partially unexpected.

Or, as another example, the apparatus 100 or server 3 may be configured to receive radio measurements from the mobile device 2-1, 2-2, 2-3 in order to perform positioning of the mobile device 2-1, 2-2, 2-3, wherein the apparatus 100 or server 3 may analyze the measurements against a radiomap, and if there are suspicious results, e.g. concerning the obtained position of the mobile determined by the positioning component and/or if there are suspicious radio parameters in the radio measurements sent from the mobile device 2-1, 2-2, 2-3 to the external server, it may be determined in action 710 by the apparatus 100 or server 3 that the positioning enabled by this mobile device 2-1, 2-2, 2-3 is considered to be at least partially unexpected. Then, for instance, it may be obtained in action 310 of method 300 that positioning enabled by this mobile device 2-1, 2-2, 2-3 is considered to be at least partially unexpected.

Figure 7B:
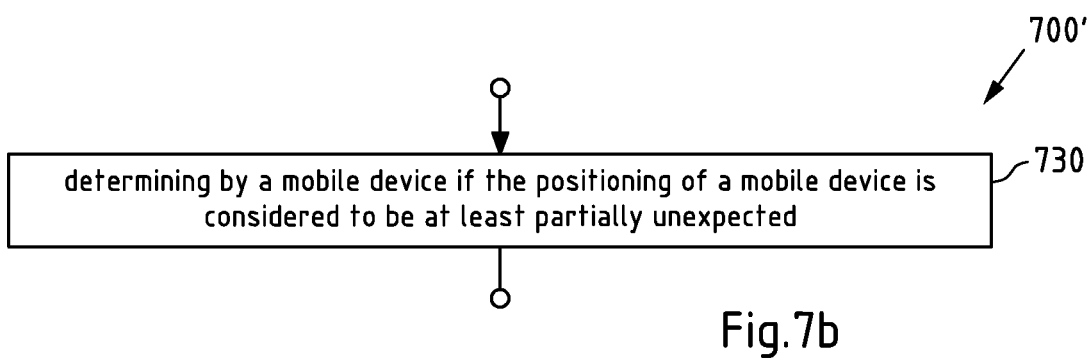
FIG. 7b is a flow chart illustrating an exemplary embodiment of a method 700' according to the invention.

FIG. 7b is a flow chart 700' illustrating an exemplary embodiment of a method according to the invention. Without limiting the scope of the invention, it may be assumed in the following that a mobile device 2-1, 2-2, 2-3 of the at least one mobile device 2-1, 2-2, 2-3 of system 200' performs the steps of flow chart 700' or that another mobile device 2-1, 2-2, 2-3 (not depicted in FIG. 2b) performs the steps of flow chart 700'.

Method 700' comprises determining if the positioning enabled by a mobile device 2-1, 2-2, 2-3 is considered to be at least partially unexpected (action 730). If it is determined in action 730 that the positioning enabled by the mobile device 2-1, 2-2, 2-3 is considered to be at least partially unexpected, the mobile device 2-1, 2-2, 2-3 may transmit an information regarding the respective mobile device 2-1, 2-2, 2-3 to apparatus 100 or server 3, wherein this information may be received in action 340 of method 300. Thus, the apparatus 100 or server 3 can be informed that positioning of the respective mobile device 2-1, 2-2, 2-3 is considered to be at least partially unexpected.

Therefore, with respect to the example presented of method 700' it is mobile device 2-1, 2-2, 2-3 which can detect (e.g. determine) whether positioning enabled by the mobile device 2-1, 2-2, 2-3 is considered to be at least partially unexpected, i.e., e.g., the mobile device 2-1, 2-2, 2-3 can detect spoofing.

Figure 7C:
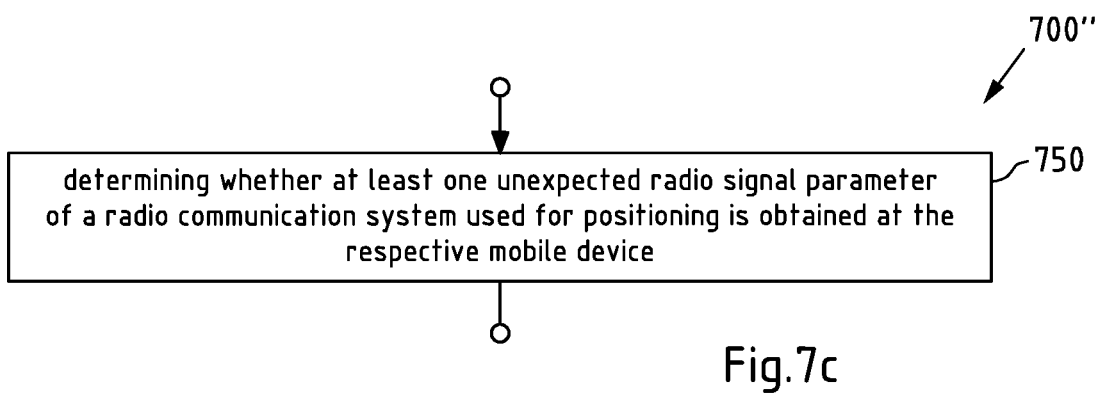
FIG. 7c is a flow chart illustrating an exemplary embodiment of a method 700" according to the invention.

FIG. 7c is a flow chart 700" illustrating an exemplary embodiment of a method according to the invention. Without limiting the scope of the invention, it may assumed in the following that a mobile device 2-1, 2-2, 2-3 of the at least one mobile device 2-1, 2-2, 2-3 of system 200' performs the steps of flow chart 700" or that another mobile device 2-1, 2-2, 2-3 (not depicted in FIG. 2b) performs the steps of flow chart 700", wherein method 700" may be considered to be a part of action 730 of method 700'.

The mobile device 2-1, 2-2, 2-3 (or another mobile device) may be configured to determine if the positioning of the respective mobile device 2-1, 2-2, 2-3 is considered to be at least partially unexpected (action 730) based on determining whether at least one unexpected radio signal parameter (and/or at least one unexpected radio signal) of a radio communication system used for positioning is obtained (e.g. received) at the respective mobile device 2-1, 2-2, 2-3 (action 750). Thus, action 730 might comprise determining whether at least one unexpected radio signal parameter of a radio communication system used for positioning is received (e.g. by a spoofed beacon) or internally obtained (e.g. by a malware running, e.g. a fake location framework) at the mobile device 2-1, 2-2, 2-3) at the respective mobile device 2-1, 2-2, 2-3.

For example, the disclosed method 700' may be part of a non-GNSS based radio positioning system as disclosed above. The mobile device 2-1, 2-2, 2-3 may be enabled for or support such a non-GNSS based radio positioning system. This may be understood to mean that the mobile device 2-1, 2-2, 2-3 is configured to estimate (e.g. determine) or to cause estimating (e.g. determining) its position at least partially based on radio signal parameters of one or more radio signals (e.g. one or more terrestrial radio signals) obtained at this position (e.g. obtained as a scanning result of scanning for observable radio signals at this position). Estimating (e.g. determining) of a position of the mobile device 2-1, 2-2, 2-3 at least partially based on (a) radio signal parameter (s) may be understood to mean that the estimating is performed as a function of the radio signal parameter(s). It is however to be understood that the estimating may optionally depend on further information like a radio map. For example, such a radio map may be configured to enable mobile devices 2-1, 2-2, 2-3 to estimate their position at least partially based on this radio map when the mobile devices 2-1, 2-2, 2-3 are located in the area covered by the radio map. For example, the radio map is represented by radio map information which may be provided (e.g. transmitted) by a positioning server to the mobile device 2-1, 2-2, 2-3 and/or which may be hold available by the mobile device 2-1, 2-2, 2-3 (e.g. stored in memory means of the mobile device 2-1, 2-2, 2-3(s)). For example, the radio map contains or represents a respective radio model for a plurality of radio devices transmitting (e.g. broadcasting) radio signals that are observable within the area covered by the radio map. If the radio map covers a building, the radio map may contain or represent, for each floor of the building, a respective radio model for a plurality of radio devices transmitting (e.g. broadcasting) radio signals that are observable on the respective floor of the building.

A respective radio model for a respective radio device of the plurality of radio devices may be understood to represent at least the expected radio coverage of the respective radio device (e.g. on a certain floor of a building). For example, the radio model of such a radio device may describe the coverage area (e.g. on a certain floor of a building) within which radio signals transmitted or triggered to be transmitted by this radio device are expected to be observable. An example for such a radio model is a radio image representing an expected radio signal strength field of the radio signals transmitted or triggered to be transmitted by this radio device. The real radio coverage of such a radio positioning support device may however deviate from the expected radio coverage as described by such a radio model. As disclosed above, the radio map may be determined by the positioning server during the training stage of the non-GNSS based radio positioning system. Causing of estimating (e.g. determining) of a position of a mobile device 2-1, 2-2, 2-3 at least partially based on the radio signal parameter(s) may be understood to mean that the radio signal parameter(s) are provided (e.g. transmitted) by the mobile device 2-1, 2-2, 2-3 to the positioning server to cause the positioning server to estimate (e.g. determine) a position of the mobile device 2-1, 2-2, 2-3 at least partially based on the radio signal parameter(s).

The one or more radio signals may be terrestrial radio signals. Examples of such a terrestrial radio signal are a Bluetooth signal, a Bluetooth Low Energy (BLE) signal, a cellular network signal, an low-power wide-area network (LPWAN) signal or a Wireless Local Area Network (WLAN) signal. The Bluetooth standards are specified by the Bluetooth Special Interest Group and are presently available under https://www.bluetooth.com/. A cellular network may for example be mobile phone network like a 2G/3G/4G/5G cellular communication network. The 2G/3G/4G/5G cellular radio communication standards are developed by the 3GPP and presently available under http://www.3gpp.org/. Examples of LPWAN specifications are the LoRaWAN specification developed by the LoRa Alliance and presently available under https://lora-alliance.org/ as well as the Narrowband IoT (NB-IoT) specification developed by 3GPP and presently available under http://www.3gpp.org/. WLAN is for example specified by the standards of the IEEE 802.11 family (bttp://www.ieee.org/).

A radio signal parameter of a certain radio signal may for example be obtained by the mobile device 2-1, 2-2, 2-3 as a scanning result when scanning for observable radio signals at a certain position (e.g. for estimating its position). Therein, a radio signal may be understood to be observable at a certain position if the radio signal is receivable with a minimum quality (e.g. a minimum signal-to-noise ratio and/or a minimum signal power, e.g. at least −90 dbm or −95 dbm) at this position. For example, the mobile device 2-1, 2-2, 2-3 may determine at least one respective radio signal parameter for each radio signal observed when scanning for radio signals at a certain position. The determined radio signal parameters may then for example be obtained as scanning results. Thus, the at least one radio signal parameter used in action 750 may be obtained by the mobile device 2-1, 2-2, 2-3 as a scanning result when scanning for observable radio signals of the radio communication system at a certain position. Or, as another example, the radio signal parameter used in action 750 may be obtained by the mobile device 2-1, 2-2, 2-3 based on an authentic radio parameter obtained as a scanning result when scanning for observable radio signals of the radio communication system at a certain position, wherein the authentic radio parameter might be spoofed by a malware running on the mobile device 2-1, 2-2, 2-3 leading to spoofed radio parameter which can be detected during action 750 as being an unexpected radio signal parameter.

A radio signal parameter of a certain radio signal may be understood to be at least one of (1) an information (e.g. an identifier) contained in the radio signal and (2) a representation (e.g. an indicator or a value) of a physical quantity (e.g. a received signal strengths) of the radio signal. Accordingly, a radio signal parameter may be determined by at least one of (1) extracting information contained in the radio signal and (2) measuring a physical quantity (e.g. a received signal strength) of the radio signal.

For example, the mobile device 2-1, 2-2, 2-3 may scan for observable radio signals at the first position and the second position for estimating its position (e.g. based on a non-GNSS based radio positioning system as disclosed above). The one or more first radio signal parameters and the one or more second radio signal parameters may then be obtained as scanning results. As discussed above, a spoofing malware running on the mobile device 2-1, 2-2, 2-3 may falsify such scanning results.

The obtained first radio signal parameters and the obtained second radio signal parameters may be understood to be authentic radio signal parameters (e.g. determined by the mobile device 2-1, 2-2, 2-3 when scanning for observable radio signals at the first position and the second position, respectively) as well as manipulated (e.g. falsified or spoofed) radio signal parameters (e.g. falsified or generated by a spoofing malware running on the mobile device 2-1, 2-2, 2-3). Moreover, it is to be understood that at least some of the radio signals observed by the mobile device 2-1, 2-2, 2-3 when scanning for observable radio signals at the first position and the second position, respectively, may be manipulated (e.g. falsified or spoofed) radio signals and, thus, the authentic radio signal parameters may at least partially based on such falsified radio signals.

For instance, as an example, said determining whether at least one unexpected radio signal parameter (or at least one unexpected radio signal) of a radio communication system used for positioning is received at the respective mobile device 2-1, 2-2, 2-3 (action 750) is performed based on at least one of:

sensor information indicating a movement of the respective mobile device 2-1, 2-2, 2-3 from a first position to a second position;

a comparison between a radio map and at least radio signal parameter received by the respective mobile device 2-1, 2-2, 2-3.

The one or more first radio signal parameters may be understood to contain, for each radio signal of the one or more radio signals, at least one respective radio signal parameter obtained by the mobile device 2-1, 2-2, 2-3 at the first position (e.g. when scanning for radio signals at the first position); and the one or more second radio signal parameters may be understood to contain, for each radio signal of the one or more radio signals, at least one respective radio signal parameter obtained by the mobile device 2-1, 2-2, 2-3 at the second position (e.g. when scanning for radio signals at the second position).

The first position and the second position are different positions.

The one or more radio signals may be understood to be observable by the mobile device 2-1, 2-2, 2-3 at the first position and the second position. Moreover, it is to be understood that, in addition to the one or more radio signals observable at both the first position and the second position, further one or more radio signals may only be observable at the first position or the second position. Accordingly, the radio signal parameters obtained at the first position and the second position may not be limited to the one or more radio signals observable at both the first position and the second position. However, the first radio signal parameters and the second radio signal parameters may be understood to only refer to radio signal parameters of the one or more radio signals observable at both the first position and the second position. For example, each of the one or more radio signals observable at both the first position and the second position may be understood to be transmitted or triggered to be transmitted by a respective radio device such that it is observable at the first position and the second position.

Sensor information indicating a movement of the mobile device 2-1, 2-2, 2-3 may be any information (e.g. qualitatively or quantitatively) representing an event or change in the environment of the mobile device 2-1, 2-2, 2-3 detected by a sensor that is indicative (e.g. characteristic) for a movement of the mobile device 2-1, 2-2, 2-3. An event or change in the environment of the mobile device 2-1, 2-2, 2-3 may for example be an event associated with or a change of a physical quantity (e.g. acceleration, orientation, shock, speed, etc.) that is characteristic for a movement of the mobile device 2-1, 2-2, 2-3.

Obtaining the sensor information may be understood to mean at least one of receiving the sensor information (e.g. from a remote device like a sensor device, an activity tracker or a smartwatch) and determining the sensor information (e.g. by detecting an event or change in the environment of the mobile device 2-1, 2-2, 2-3 by a sensor of the mobile device 2-1, 2-2, 2-3).

Determining, at least partially based on the first radio signal parameters and the sensor information, whether the second radio signal parameters are expected or unexpected for the second position of the mobile device 2-1, 2-2, 2-3 may be understood to mean that the determining depends on the first radio signal parameters and the sensor information. It is however to be understood that the determining may optionally depend on further information (e.g. further radio signal parameters, a radio map, etc.). For example, the determining may be at least a function of the first radio signal parameters and the sensor information and, optionally, of further information.

The determining may be performed according to predetermined rules (e.g. a predetermined algorithm). The predetermined rules may for example represent at least one of (1) a definition for second radio signal parameters expected for the second position of the mobile device 2-1, 2-2, 2-3 and (2) a definition for second radio signal parameters unexpected for the second position of the mobile device 2-1, 2-2, 2-3.

The second radio signal parameters of the one or more radio signals may be defined to be unexpected for the second position of the mobile device 2-1, 2-2, 2-3 if the second radio signal parameters represent at least one of (1) an information and (2) a representation of a physical quantity that is not expected to be obtained (e.g. obtained as a scanning result) for the one or more radio signals at the second position. Otherwise, the second radio signal parameters of the one or more radio signals may be defined to be expected for the second position of the mobile device 2-1, 2-2, 2-3.

For example, such a rule or definition may be based on the assumption that certain information (e.g. an identifier) contained in the one or more radio signals does not change. Thus, it may be expected that the same information (e.g. an identifier) is extracted from the one or more radio signals by the mobile device 2-1, 2-2, 2-3 after moving from the first position to the second position. Accordingly, it may be predetermined that, if sensor information indicating a movement of the mobile device 2-1, 2-2, 2-3 from the first position to the second position have been obtained and the second radio signal parameters do not contain the same information (e.g. an identifier) than the first radio signal parameters, it is determined that the second radio signal parameters are unexpected for the second position of the mobile device 2-1, 2-2, 2-3. Otherwise, it may be determined that the second radio signal parameters are expected for the second position of the mobile device 2-1, 2-2, 2-3.

To give another example, such rule or a definition may additionally or alternatively be based on the assumption a certain physical quantity of the one radio signals (e.g. a received signal strength) may change when the mobile device 2-1, 2-2, 2-3 moves from the first position to the second position. Accordingly, it may be predetermined that, if sensor information indicating a movement of the mobile device 2-1, 2-2, 2-3 from the first position to the second position have been obtained and the second radio signal parameters contain one or more different representations of a certain physical quantity of the one radio signals than the first radio signal parameters, it is determined that the second radio signal parameters are expected for the second position of the mobile device 2-1, 2-2, 2-3. Otherwise, it may be determined that the second radio signal parameters are unexpected for the second position of the mobile device 2-1, 2-2, 2-3.

Furthermore, as an example, if a comparison between a radio map and at least radio signal parameter obtained by the respective mobile device 2-1, 2-2, 2-3 is used for determining whether the at least one radio signal parameter is considered to be unexpected or no in action 750.

Determining, at least partially based on one or more radio signal parameters and radio map information, whether the one or more radio signal parameters are expected or unexpected (action 750) may be understood to mean that it is determined whether the one or more radio signal parameters are expected or unexpected at least partially based on the radio map information, for example by determining whether the one or more radio signal parameters are expected or unexpected according to the expected radio environment indicated by the radio map. It is however to be understood that the determining may optionally depend on further information (e.g. further radio signal parameters, sensor information, etc.). For example, the determining may be at least a function of the one or more radio signal parameters and the radio map information and, optionally, of further information. To give a non-limiting example, if the observation position at which the one or more radio signal parameters have been obtained is known, the determining may be further based on this observation position or information representing this observation position.

The determining may be performed according to predetermined rules (e.g. a predetermined algorithm). The predetermined rules may for example represent at least one of (1) a definition when the one or more radio signal parameters are to be determined to be expected at least partially based on the radio map information (e.g. the expected radio environment of the predetermined environment indicated by the radio map represented by the radio map information) and (2) a definition when the one or more radio signal parameters are to be determined to be unexpected at least partially based on the radio map information (e.g. the expected radio environment of the predetermined environment indicated by the radio map represented by the radio map information).

For example, the one or more radio signal parameters may be defined to be unexpected if the one or more radio signals or the one or more radio signal parameters of the one or more radio signals are not expected to be observable (e.g. obtainable as scanning results) within the predetermined environment according to the expected radio environment indicated by the radio map represented by the radio map information. Otherwise, the one or more radio signal parameters may be defined to be expected.

If spoofing occurs, the one or more radio signals and/or the one or more radio signal parameters of the one or more radio signals may be not in conformity with the expected radio environment indicated by the radio map represented by the radio map information and, thus, the one or more radio signal parameters may be determined to be unexpected. For example, if a malware running on the mobile device 2-1, 2-2, 2-3 falsifies the scanning results, a representation of a certain physical quantity of the one or more radio signals may not match the expected radio environment of the predetermined environment. Accordingly, if it is determined that the one or more radio signal parameters are unexpected (action 750), the one or more radio signals and/or the one or more radio signal parameters may be considered to be potentially manipulated. The disclosed methods 700' and 700" allow for identifying potentially manipulated radio signals and/or radio signal parameters at least partially based on radio map information and, thus, to mitigate threats associated with manipulation techniques like spoofing and jamming.

Furthermore, as another embodiment of method 700' depicted in FIG. 7b, i.e., of action 730, said determining by the respective mobile device 2-1, 2-2, 2-3 if the positioning of the respective mobile device 2-1, 2-2, 2-3 is considered to be at least partially unexpected (action 730) is performed based on at least one of:

usage of different radio technologies and/or different frequency bands for positioning by the respective mobile device 2-1, 2-2, 2-3;

usage of a signed location estimate created by a positioning engine of the respective mobile device 2-1, 2-2, 2-3.

As an example, if different radio technologies and/or different frequency bands for positioning are used by the respective mobile device 2-1, 2-2, 2-3 a first estimate of a position can be obtained based on the (e.g., by using the) first radio technology (and/or a first frequency band) and a second estimate of a position (e.g. the same position as before for the first estimate or a position near the position used for the first position, e.g. not more than 1 m, 2 m or 3 m away) can be obtained based on the (e.g., by using the) second radio technology (and/or the first frequency band) by the respective mobile device 2-1, 2-2, 2-3, wherein the first radio technology and the second radio technology differ from each other and the first frequency band and the second frequency band differ from each other. Then, for example, based on a comparison between the first estimate of a position and the second estimate of a position it can be determined whether positioning of the respective mobile device 2-1, 2-2, 2-3 is considered to be at least partially unexpected or not (action 730), wherein, as an example, the positioning of the respective mobile device 2-1, 2-2, 2-3 may be considered to be at least partially unexpected if a distance between first estimate of a position and the second estimate of a position exceeds a predefined threshold. Furthermore, as an example, based on based on the comparison between the first estimate of a position and the second estimate of a position it can that at least one unexpected radio signal parameter (and/or at least one unexpected radio signal) of a radio communication system used for positioning is obtained (e.g. received) at the respective mobile device 2-1, 2-2, 2-3 (action 750), e.g., if a distance between the first estimate of a position and the second estimate of a position exceeds the predefined threshold.

As another example, a signed location estimate created by a positioning engine of the respective mobile device 2-1, 2-2, 2-3 may be used in action 730 for determining if the positioning of the respective mobile device 2-1, 2-2, 2-3 is considered to be at least partially unexpected.

For instance, the positioning engine of the respective mobile device 2-1, 2-2, 2-3 may be configured to create a signature for a position estimate (e.g. a location estimate), e.g. by using an embedded private key. Then, the positioning engine of the mobile device 2-1, 2-2, 2-3 may provide the position estimate and its signature to an application of the mobile device 2-1, 2-2, 2-3. The application may verify the position estimate by using the signature and an embedded public key. E.g., the application only accepts the estimate of the signature is valid for the position estimate, otherwise (i.e. if the signature is not valid for the position estimate) it may be determined that the positioning of the respective mobile device 2-1, 2-2, 2-3 is considered to be at least partially unexpected in action 730.

As a result of estimating a position of said mobile device 2-1, 2-2, 2-3 position data representing the estimated position of said mobile device 2-1, 2-2, 2-3 may be obtained. For example, the position data contain or represent position coordinates of the estimated position like latitude and longitude and, optionally, altitude, of the estimated position. The obtained position data may be NMEA data (e.g. part of or configured to be part of an NMEA message or NMEA sentence) as specified by a NMEA a standard for communication between marine electronics (e.g. GNSS positioning devices) and many other types of instruments. The NMEA standards are developed by the National Marine Electronics Association (NMEA) and are presently available under: https://www.nmea.org/. In particular, the NMEA 0183 standard is a common standard for communication of position data (e.g. GNSS data).

The digital signature may be determined according to a digital signature algorithm. Input parameters of such an algorithm may be a cryptography key and the position data or a hash value of the position data. Accordingly, the digital signature may be determined at least partially based on such input parameters. An example for such a cryptography key is a private key of an asymmetric cryptography key pair. A hash value of the position data may be obtained according to a cryptography hash algorithm receiving the position data as input parameter. For example, a computer program code representing the positioning program may contain and/or represent instructions for determining the digital signature of the position data according to the digital signature algorithm and/or the cryptography hash algorithm.

Non-limiting examples for a digital signature algorithm for determining the digital signature are (1) the Digital Signature Algorithm (DSA) as specified in FIPS186 standard by the National Institute of Standards and Technology (NIST) (https://csrc.nist.gov) and (2) the Rivest-Shamir-Adleman (RSA) algorithm as specified in PKCS #1 presently available as RFC8017 from the Internet Engineering Task Force (IETF) (https://tools.ietf.org/). As a result of determining a digital signature of said position data signature data representing the determined digital signature of said position data may be obtained.

Examples of cryptography hash algorithms are (1) Secure Hash Algorithm 1 (SHA-1) as specified in FIPS180 standards by the NIST, (2) Secure Hash Algorithm 3 (SHA-3) as specified in FIPS202 standard by the NIST or (3) the MD5 Message-Digest Algorithm (MD5) as specified in RFC1321 and RFC6151 presently available from the IETF.

The digital signature of said position data may enable an entity (e.g. the one or more application programs) receiving the position data and the digital signature (or digital signature data representing the digital signature) to verify the authenticity and/or integrity of the position data. Therein, verifying the authenticity and/or integrity of the position data may be performed according to a digital signature algorithm and/or a cryptography hash algorithm (e.g. the algorithm(s) used for determining the digital signature or (an) algorithm(s) corresponding to the algorithm(s) used for determining the digital signature) which receives the position data, the digital signature (or signature data representing the digital signature) and a cryptography key as input parameter. An example for such a cryptography key is a public key of an asymmetric cryptography key pair. If the authenticity and/or integrity of the position data is not verified or verifiable by the signature data and the cryptography key, the position data may be considered to be potentially manipulated.

Therefore, an application of the mobile device 2-1, 2-2, 2-3 receiving the position data and the digital signature can determine whether the position data may be considered to be potentially manipulated if the authenticity and/or integrity of the position data is not verified or verifiable by the signature data and the cryptography key, and if the position data is considered to be potentially manipulated, it can be determined in action 730 that positioning of the respective mobile device 2-1, 2-2, 2-3 is considered to be at least partially unexpected.

Providing the position data and the signature data to the one or more application programs may be understood to mean that the position data and the signature data are communicated to or provided such that they receivable by (e.g. retrievable by) the application programs, for example by means of a programming interface or a service (e.g. being part of or defined by an operating system of the mobile device 2-1, 2-2, 2-3). Non-limiting exemplary operating systems of the mobile device 2-1, 2-2, 2-3 are the iOS operating system and the Android operating system.

The application programs may for example be part of a higher software layer of software architecture of the mobile device 2-1, 2-2, 2-3 than the positioning program. For example, the application programs are part of the application layer; and the positioning program may for example be part of a lower software layer which provides services to application programs of the application layer. For example, the positioning program is one of a middleware, a firmware or part of the operating system of the mobile device 2-1, 2-2, 2-3.

By providing the position data together with the signature data to the one or more application programs, the applications programs are enabled to verify the authenticity and/or integrity of the position data. If the position data provided by the positioning program are intercepted and manipulated by a malware, they will thus be recognized by the application program as potentially manipulated. The disclosed method thus serves for recognizing and/or preventing manipulation of position data representing an estimated position.

Figure 8:
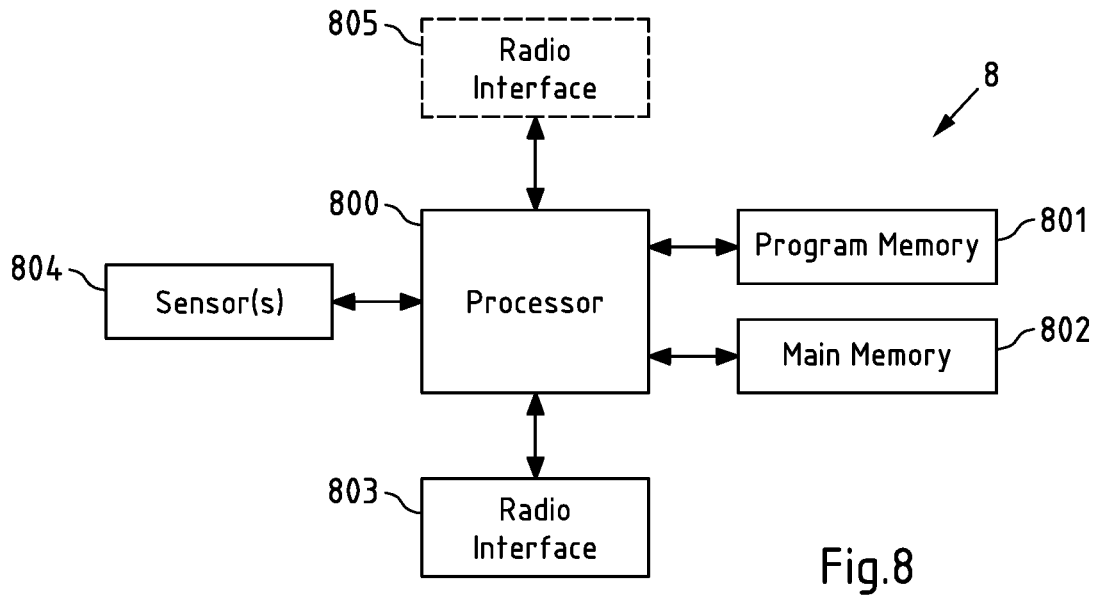
FIG. 8 is a block diagram of an exemplary embodiment of a mobile device according to the invention.

FIG. 8 is a block diagram of an exemplary embodiment of mobile device 8 according to the invention. In the following, it is assumed that mobile devices 2-1 to 2-3 of FIG. 2*a* corresponds to this mobile device 8 without any limitations.

Mobile device 8 comprises a processor 800. Processor 800 may represent a single processor or two or more processors, which are for instance at least partially coupled, for instance via a bus. Processor 800 executes a computer program code stored in program memory 801 (e.g. computer program code causing mobile device 8 to perform any one embodiment of the disclosed method (e.g. the steps of any one embodiment of the disclosed method) or a part thereof (e.g. at least some steps of any one embodiment of the disclosed method) (in particular method 700' and/or method 700" as described with respect to of FIGS. 7*b* and 7*c*), when executed on processor 800), and interfaces with a main memory 802. Program memory 801 may also contain an operating system for processor 800 and radio map information representing a radio map of the predetermined environment system 1. Some or all of memories 801 and 802 may also be included into processor 800. One of or both of memories 801 and 802 may be fixedly connected to processor 800 or at least partially removable from processor 800, for example in the form of a memory card or stick.

A program memory (e.g. program memory 801) may for example be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

A main memory (e.g. main memory 802) may for example be a volatile memory. It may for example be a DRAM memory, to give non-limiting example. It may for instance be used as a working memory for a processor (e.g. processor 800) when executing an operating system and/or programs.

Processor 800 further controls a radio interface 803 configured for receiving and, optionally, transmitting radio signals. A radio interface may be or may comprise a radio receiver circuit and/or a radio transmitter circuit and/or a radio transceiver circuit. Such circuits may comprise modulators, filters, mixers, switches and/or one or more antennas to allow transmission and/or reception of radio signals.

In the following, it is assumed for exemplary purposes that radio interface 803 is a BLE transceiver configured to transmit and receive BLE radio signals in line with any current or future version of the Bluetooth standard supporting a low energy mode. Radio interface 803 enables mobile device 8 to scan for observable BLE radio signals transmitted (e.g. broadcasted) by BLE beacons 4-1 to 4-5 of system 200'. Therein, a BLE radio signal may be understood to be observable if the BLE radio signal is receivable with a minimum quality (e.g. a minimum signal-to-noise ratio and/or a minimum signal power, e.g. at least −90 dBm or −95 dBm). Moreover, the BLE transceiver is configured, alone or together with processor 800, to determine one or more radio signal parameters of BLE radio signals observed (e.g. received) when scanning for observable radio signals. To this end, the BLE transceiver may for example extract, from each observed BLE radio signal, the respective UUID contained therein and measure the respective received signal strength of each observed BLE radio signal. The extracted UUIDs and the received signal strength values may then for example be provided to processor 800 as scanning results. It is to be understood that any computer program code required for receiving and processing received BLE radio signals may be stored in an own memory of the radio interface 803 and executed by an own processor of the radio interface 803 or it may be stored for example in memory 802 and executed for example by processor 800.

Moreover, for instance, mobile device 8 may comprise one or more sensors 804, and the processor 800 controls the one or more sensors 804 configured for determining sensor information indicating a movement of mobile device 2. The determined sensor information may be provided to processor 800. Therein, sensor information indicating a movement of the mobile device may be any information (e.g. qualitatively or quantitatively) representing an event or change in the environment of mobile device 8 detected by a sensor that is indicative (e.g. characteristic) for a movement of mobile device 8. An event or change in the environment of mobile device 8 may for example be an event associated with or a change of a physical quantity (e.g. acceleration, orientation, shock, speed, etc.) that is characteristic for a movement of mobile device 8.

Examples of sensors 804 are a GNSS sensor (e.g. a GPS sensor and/or a Galileo sensor), an inertial or motion sensor (e.g. a speed sensor, an acceleration sensor, a shock sensor, an activity or step sensor, an orientation sensor like a compass or a gyroscope), an optical sensor (e.g. a camera), or a combination thereof.

Processor 800 further controls an optional radio interface 805 configured to communicate via a cellular radio network (e.g. to transmit and receive cellular radio signals). For example, radio interface 805 may be or may comprise a 2G/3G/4G/5G radio transceiver. Mobile device 8 may use radio interface 805 to communicate with positioning server 3 of system 1 (e.g. via the internet). For example, mobile device 8 may use radio interface 805 to transmit radio fingerprint observation reports to positioning server 3 and/or receive radio map information from positioning server 3.

The components 801 to 805 of mobile device 8 may for instance be connected with processor 800 by means of one or more serial and/or parallel busses.

It is to be understood that mobile device 8 may comprise various other components like a user interface for receiving user input.

Figure 9:
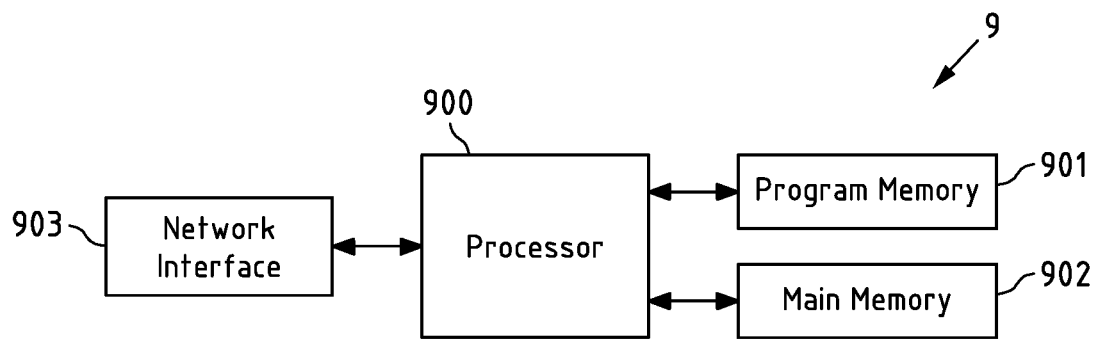
FIG. 9 is a block diagram of an exemplary embodiment of a server according to the invention.

FIG. 9 is a block diagram of an exemplary embodiment of a server 9 according to the invention, which may (for instance) represent a positioning server. In the following, it may be assumed that server 3 of system 200' of FIG. 2b corresponds to this server 9. Furthermore, server 9 may be considered to represent a cloud component or server 9 may be considered to represent apparatus 100 of FIG. 1.

Server 9 comprises a processor 900. Processor 900 may represent a single processor or two or more processors, which are for instance at least partially coupled, for instance via a bus. Processor 900 executes a computer program code stored (e.g. computer program code causing server 9 to perform any one embodiment of the disclosed method (e.g. the steps of any one embodiment of the disclosed method) or a part thereof (e.g. at least some steps of any one embodiment of the disclosed method) (in particular method 200, and/or method 300, and/or method 300', and/or method 300", and/or method 400, and/or method 500, and/or method 500', and/or method 600, and/or method 700 as described with respect to of FIGS. 2a, 3a, 3b, 3c, 4, 5a, 5b, 6 and 7a), in program memory 901, and interfaces with a main memory 902.

Program memory 901 may also contain an operating system for processor 900 and, for instance, radio map information representing a radio map of the predetermined environment system 200'. Some or all of memories 901 and 902 may also be included into processor 900. One of or both of memories 901 and 902 may be fixedly connected to processor 900 or at least partially removable from processor 900, for example in the form of a memory card or stick.

Processor 900 further controls a network interface 903 which is configured to communicate via a communication network (e.g. the internet). Server 3 may use network interface 903 to communicate with mobile devices 2-1 to 2-3 of FIG. 2b (e.g. via the internet). For example, positioning server 9 may use network interface 903 to receive radio fingerprint observation reports from mobile devices 2-1 to 2-3 and/or transmit radio map information to mobile devices 2-1 to 2-3. Furthermore, for instance, positioning server 9 may use network interface 903 to receive the information regarding the respective mobile device 2-1, 2-2, 2-3 from the respective mobile device 2-1, 2-2, 2-3 during action 340 of method 300', and/or positioning server 9 may use network interface 903 to receive said information from another server or a cloud component during action 360 of method 300". And/or, for example, positioning server 9 may use network interface 903 to provide information identifying the respective mobile device 2-1, 2-2, 2-3 to at least one location based service during action 410 of method 400 (similar: action 550 of method 500), and/or, for instance, positioning server 9 may use network interface to obtain status information regarding the respective mobile device 2-1, 2-2, 2-3 during action 580 of method 500', in particular of said status information is received from the respective mobile device 2-1, 2-2, 2-3 or from another server or cloud component.

The components 301 to 303 of positioning server 3 may for example be connected with processor 300 by means of one or more serial and/or parallel busses.

It is to be understood that positioning server 3 may comprise various other components like a user interface for receiving user input.

Furthermore, as an example embodiment, server 9 might represent a positioning server. Then, processor 900 executes a computer program code stored (e.g. computer program code causing server 9 to determine a radio map of the predetermined environment of system 1 based on radio fingerprint observation reports collected by mobile devices like mobile devices 2-1 to 2-3) in program memory 301. For example, positioning server 9 may use network interface 903 to receive radio fingerprint observation reports from mobile devices 2-1 to 2-3 and/or transmit radio map information to mobile devices 2-1 to 2-3.

Figure 10:
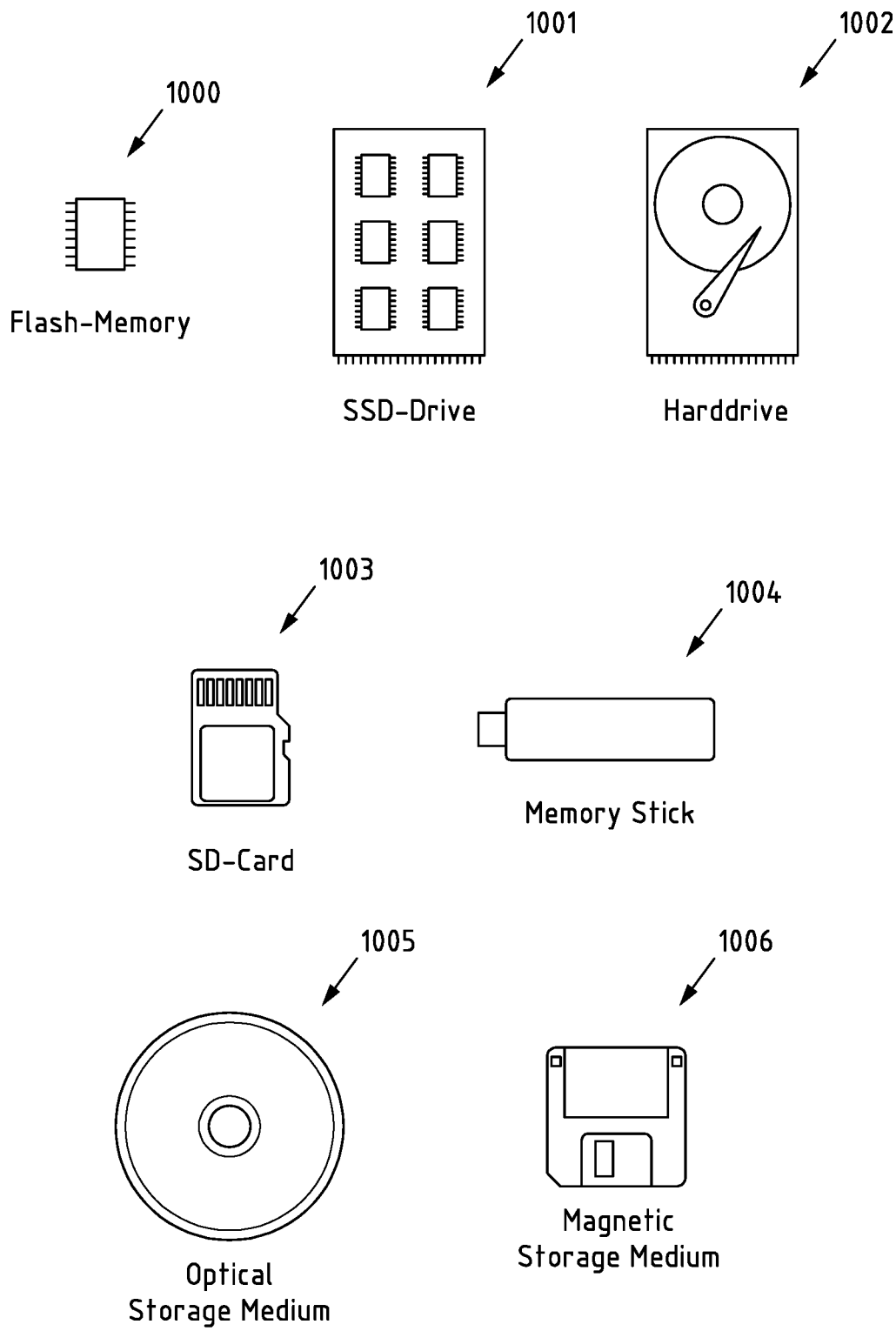
FIG. 10 is a schematic illustration of examples of tangible and non-transitory storage media according to the invention.

FIG. 10 is a schematic illustration of examples of tangible and non-transitory computer-readable storage media according to the present invention that may for instance be used to implement memory 801 of FIG. 8, and memory 901 of FIG. 9. To this end, FIG. 10 displays a flash memory 1000, which may for instance be soldered or bonded to a printed circuit board, a solid-state drive 1001 comprising a plurality of memory chips (e.g. Flash memory chips), a magnetic hard drive 1002, a Secure Digital (SD) card 1003, a Universal Serial Bus (USB) memory stick 1004, an optical storage medium 1005 (such as for instance a CD-ROM or DVD) and a magnetic storage medium 1006.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (1) to a combination of processor(s) or (2) to sections of processor(s)/software (including digital signal processor(s)), software, and memory(ies) that work together to cause an apparatus, such as a mobile phone, to perform various functions) and
(c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 801 and 901 of FIGS. 8 and 9, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (1) A, or (2) B, or (3) C, or (4) A and B, or (5) A and C, or (6) B and C, or (7) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. A method, comprising:
maintaining a database comprising information identifying one or more mobile devices that are potentially manipulated, wherein each respective mobile device of the one or more mobile devices that are potentially manipulated is configured to enable positioning based on radio signals and wherein said positioning enabled by the respective mobile device is considered to be at least partially unexpected;
providing at least a portion of the information identifying one or more mobile devices that are potentially manipulated with a location-based service such that the location-based service blocks the one or more mobile devices with respect to a location of the location-based service;
for a selected mobile device of the one or more mobile devices identified by the database, determining whether positioning enabled by the selected mobile device is still considered to be unexpected; and
responsive to determining that the positioning enabled by the selected mobile device is not still considered to be unexpected:
    removing the selected mobile device from the database by removing the information identifying the selected mobile device from the database; and
    providing the information identifying the selected mobile device to the location-based service with an indication that the selected mobile device is not considered to be potentially manipulated.

2. The method according to claim 1, wherein said one or more mobile devices are a plurality of devices.

3. The method according to claim 1, wherein said positioning enabled by the respective mobile device is considered to be at least partially unexpected if the positioning enabled by the respective mobile device is considered to be potentially manipulated.

4. The method according to claim 1, further comprising obtaining information regarding a mobile device, wherein positioning enabled by the mobile device is considered to be at least partially unexpected, and including the information identifying the mobile device in the database.

5. The method according to claim 4, wherein said obtaining information regarding a mobile device comprises receiving said information regarding the mobile device from the mobile device.

6. The method according to claim 4, wherein said obtaining information regarding the mobile device comprises receiving said information from a server or a cloud component via a cloud application interface.

7. The method according to claim 1, further comprising:
accessing the database to determine whether information identifying a mobile device is present in the database;
when it is determined that information identifying the mobile device is present in the database, determining that at least one of a position estimation provided by the mobile device or a position estimation obtained by radio measurements of the mobile device is not to be trusted.

8. The method according to claim 1, wherein said determining whether positioning enabled by the respective mobile device is still considered to be unexpected comprises:
obtaining status information regarding the respective mobile device, the status information being indicative whether the positioning enabled by the respective mobile device is considered to be at least partially unexpected or not.

9. The method according to claim 8, wherein said obtaining status information regarding the respective mobile device comprises receiving said status information from a server or cloud component via a cloud application interface.

10. The method according to claim 8, wherein said obtaining status information regarding the respective mobile device comprises receiving said status information from the respective mobile device.

11. The method according to claim 1, further comprising revoking a positioning license associated with a mobile device at least for a predetermined period of time if the mobile device is identified by the database comprising information identifying of one or more mobile devices that are potentially manipulated.

12. The method according to claim 6, further comprising determining by the server or the cloud component if the positioning enabled by the respective mobile device is considered to be at least partially unexpected, wherein said determining if the positioning enabled by the respective mobile device is considered to be at least partially unexpected is performed by a positioning component of the server or the cloud component.

13. The method according to claim 6, further comprising determining by the respective mobile device if the positioning of the respective mobile device is considered to be at least partially unexpected.

14. The method according to claim 13, wherein said determining by the respective mobile device if the positioning of the respective mobile device is considered to be at least partially unexpected is performed based on at least one of:
usage of different radio technologies and/or different frequency bands for positioning by the respective mobile device; or
usage of a signed location estimate created by a positioning engine of the respective mobile device.

15. The method according to claim 13, wherein the respective mobile device is configured to determine if the positioning of the respective mobile device is considered to be at least partially unexpected based on determining whether at least one unexpected radio signal parameter of a radio communication system used for positioning is obtained and/or at least one unexpected radio signal of a radio communication system used for positioning is received at the respective mobile device.

16. The method according to claim 15, wherein said determining whether at least one unexpected radio signal parameter of a radio communication system used for positioning is obtained and/or at least one unexpected radio signal of a radio communication system used for positioning is received at the respective mobile device is performed based on at least one of:
sensor information indicating a movement of the respective mobile device from a first position to a second position; or
a comparison between a radio map and at least one radio signal parameter received by the respective mobile device.

17. An apparatus comprising at least one processor and at least one memory including computer program code, the at least one memory and the computer program code configured to, with the at least one processor, cause the apparatus at least to perform:
maintain a database comprising information identifying one or more mobile devices that are potentially manipulated, wherein each respective mobile device of the one or more mobile devices that are potentially manipulated is configured to enable positioning based on radio signals and wherein said positioning enabled by the respective mobile device is considered to be at least partially unexpected;
provide at least a portion of the information identifying one or more mobile devices that are potentially manipulated with a location-based service such that the location-based service blocks the one or more mobile devices with respect to a location of the location-based service;
for a selected mobile device of the one or more mobile devices identified by the database, determining whether positioning enabled by the selected mobile device is still considered to be unexpected; and
responsive to determining that the positioning enabled by the selected mobile device is not still considered to be unexpected:
remove the selected mobile device from the database by removing the information identifying the selected mobile device from the database; and
provide the information identifying the selected mobile device to the location-based service with an indication that the selected mobile device is not considered to be potentially manipulated.

18. A non-transitory computer-readable storage medium storing computer program code that is configured to:
maintain a database comprising information identifying one or more mobile devices that are potentially manipulated, wherein each respective mobile device of the one or more mobile devices that are potentially manipulated is configured to enable positioning based on radio signals and wherein said positioning enabled by the respective mobile device is considered to be at least partially unexpected;
provide at least a portion of the information identifying one or more mobile devices that are potentially manipulated with a location-based service such that the location-based service blocks the one or more mobile devices with respect to a location of the location-based service;

for a selected mobile device of the one or more mobile devices identified by the database, determining whether positioning enabled by the selected mobile device is still considered to be unexpected; and responsive to determining that the positioning enabled by the selected mobile device is not still considered to be unexpected:

remove the selected mobile device from the database by removing the information identifying the selected mobile device from the database; and provide the information identifying the selected mobile device to the location-based service with an indication that the selected mobile device is not considered to be potentially manipulated.

\* \* \* \* \*